(12) United States Patent
Hamaoka et al.

(10) Patent No.: US 11,355,785 B2
(45) Date of Patent: Jun. 7, 2022

(54) POWER STORAGE MODULE AND METHOD FOR MANUFACTURING POWER STORAGE MODULE

(71) Applicant: KABUSHIKI KAISHA TOYOTA JIDOSHOKKI, Kariya (JP)

(72) Inventors: Satoshi Hamaoka, Kariya (JP); Taku Inoue, Kariya (JP); Akihito Tsuge, Kariya (JP); Hirokazu Kotake, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 124 days.

(21) Appl. No.: 16/650,268

(22) PCT Filed: Jul. 19, 2018

(86) PCT No.: PCT/JP2018/027151
§ 371 (c)(1),
(2) Date: Mar. 24, 2020

(87) PCT Pub. No.: WO2019/064843
PCT Pub. Date: Apr. 4, 2019

(65) Prior Publication Data
US 2020/0243913 A1 Jul. 30, 2020

(30) Foreign Application Priority Data

Sep. 26, 2017 (JP) .............................. JP2017-185126
Jan. 24, 2018 (JP) .............................. JP2018-009599

(51) Int. Cl.
*H01M 10/0585* (2010.01)
*H01M 50/30* (2021.01)
(Continued)

(52) U.S. Cl.
CPC ........ *H01M 10/0585* (2013.01); *H01G 11/26* (2013.01); *H01G 11/58* (2013.01);
(Continued)

(58) Field of Classification Search
CPC .. H01M 10/18; H01M 10/0585; H01M 50/30; H01M 2004/029
See application file for complete search history.

(56) References Cited

U.S. PATENT DOCUMENTS

2014/0106187 A1* 4/2014 Miura ................. H01M 50/308
429/53
2014/0120392 A1 5/2014 Ueno et al.
2014/0349147 A1* 11/2014 Shaffer, II ......... H01M 10/0468
429/56

FOREIGN PATENT DOCUMENTS

EP 1 568 089 A1 8/2005
JP 2006-508518 A 3/2006
(Continued)

OTHER PUBLICATIONS

Communication dated Nov. 25, 2020, issued by the Intellectual Property Office of India in application No. 202017017104.
(Continued)

*Primary Examiner* — Jonathan G Jelsma
(74) *Attorney, Agent, or Firm* — Sughrue Mion, PLLC

(57) ABSTRACT

A power storage module includes a laminate constituted of a plurality of laminated bipolar electrodes, each of the bipolar electrodes including an electrode plate, a positive electrode provided on one surface of the electrode plate, and a negative electrode provided on the other surface of the electrode plate, wherein a plurality of internal spaces is formed between the bipolar electrodes adjacent to each other in the laminate; a frame body holding an edge portion of the electrode plate and provided with an opening communicat-
(Continued)

ing with at least one of the plurality of internal spaces; and a pressure regulating valve attached to the frame body.

20 Claims, 14 Drawing Sheets

(51) Int. Cl.
  *H01G 11/26* (2013.01)
  *H01G 11/58* (2013.01)
  *H01G 11/80* (2013.01)
  *H01G 11/86* (2013.01)
  *H01M 4/02* (2006.01)

(52) U.S. Cl.
  CPC ............. *H01G 11/80* (2013.01); *H01G 11/86* (2013.01); *H01M 50/30* (2021.01); *H01M 2004/029* (2013.01)

(56) References Cited

FOREIGN PATENT DOCUMENTS

| | | |
|---|---|---|
| JP | 2010-140794 A | 6/2010 |
| JP | 2010-287451 A | 12/2010 |
| KR | 10-2014-0026509 A | 3/2014 |
| WO | 2004/051767 A1 | 6/2004 |

OTHER PUBLICATIONS

International Preliminary Report on Patentability with translation of Written Opinion dated Mar. 31, 2020, in International Application No. PCT/JP2018/027151.

* cited by examiner

*Fig.7*
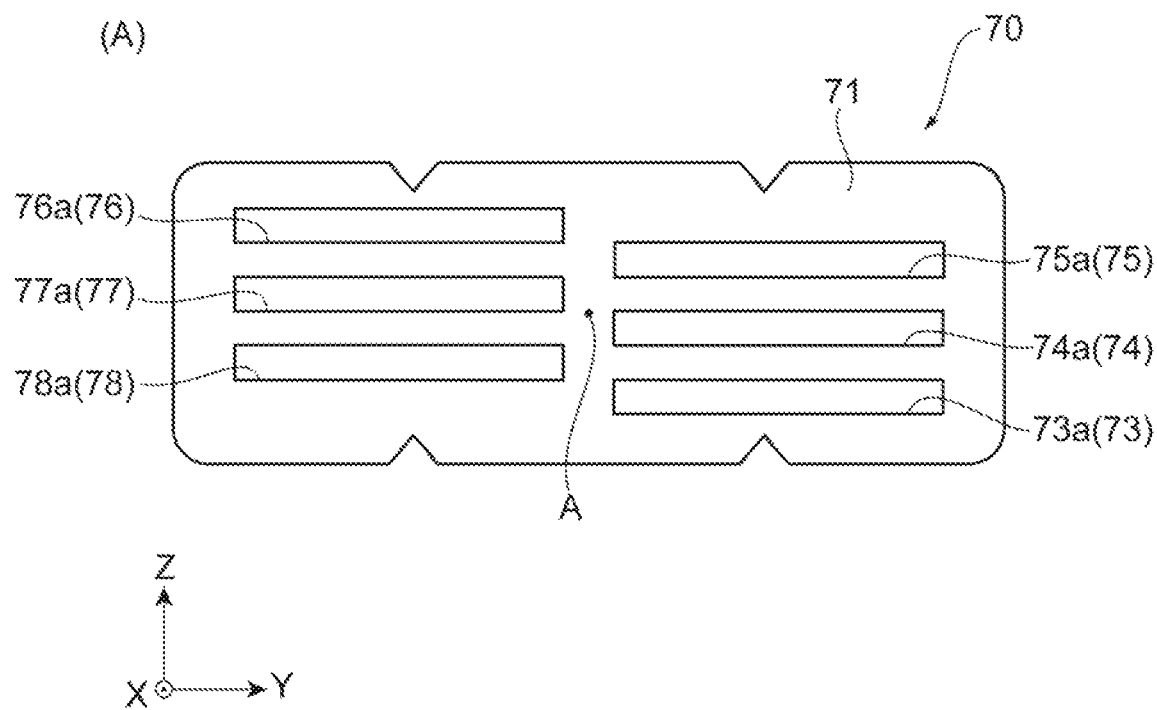
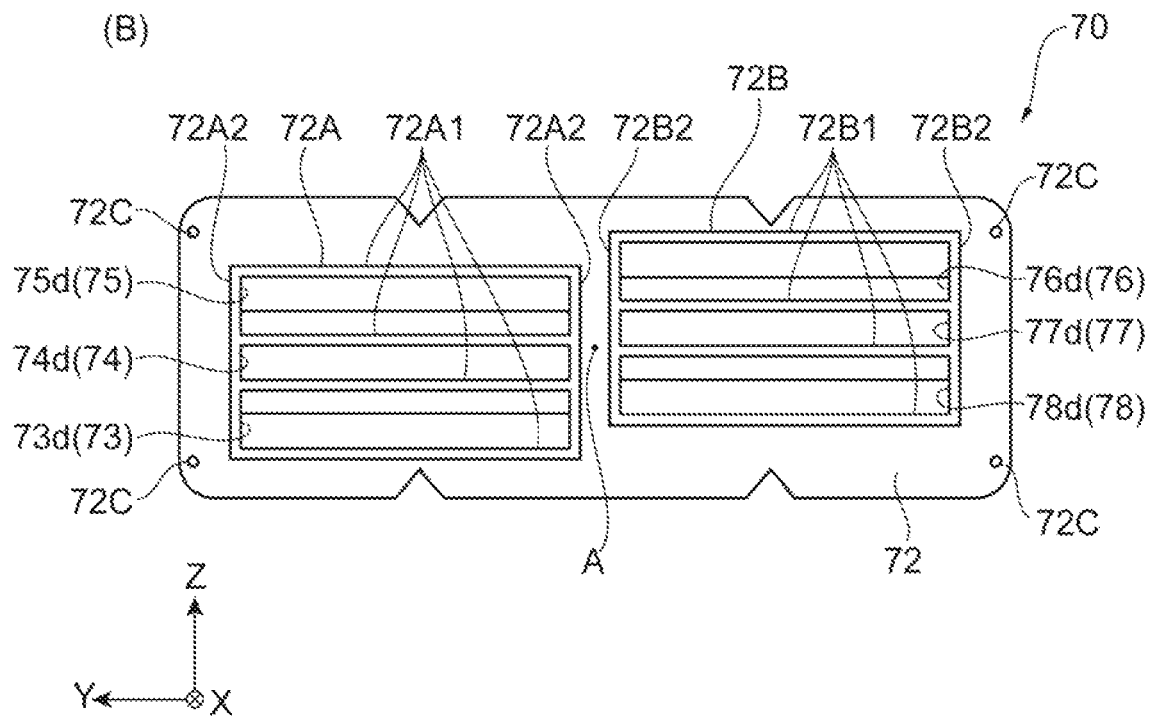

Fig.9
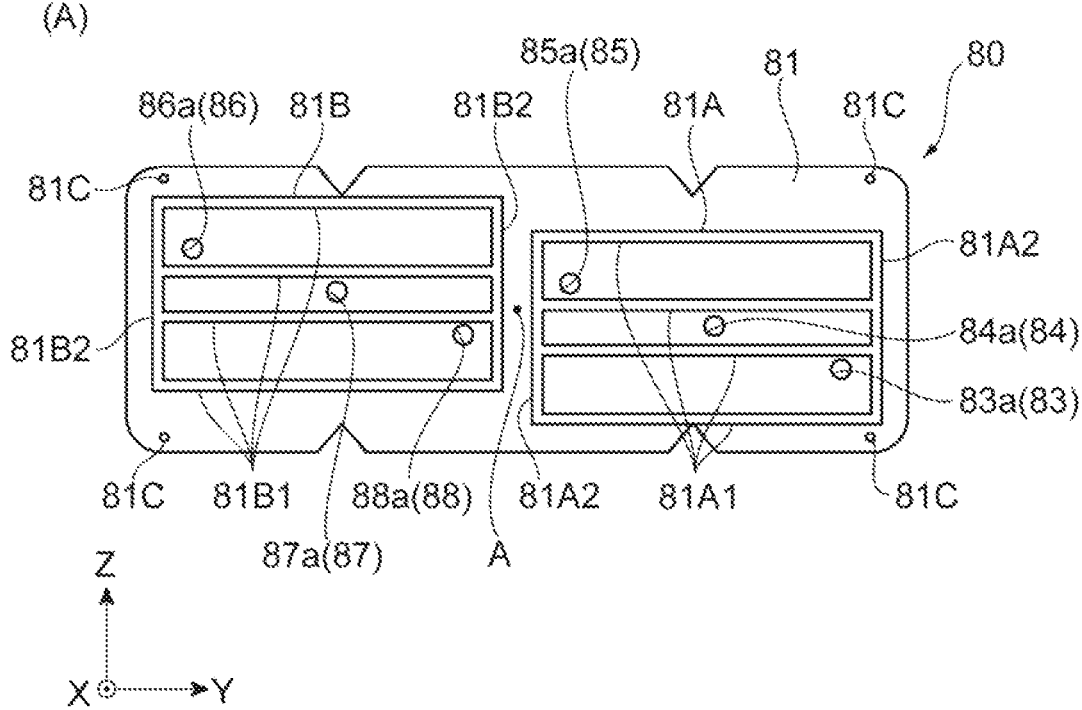
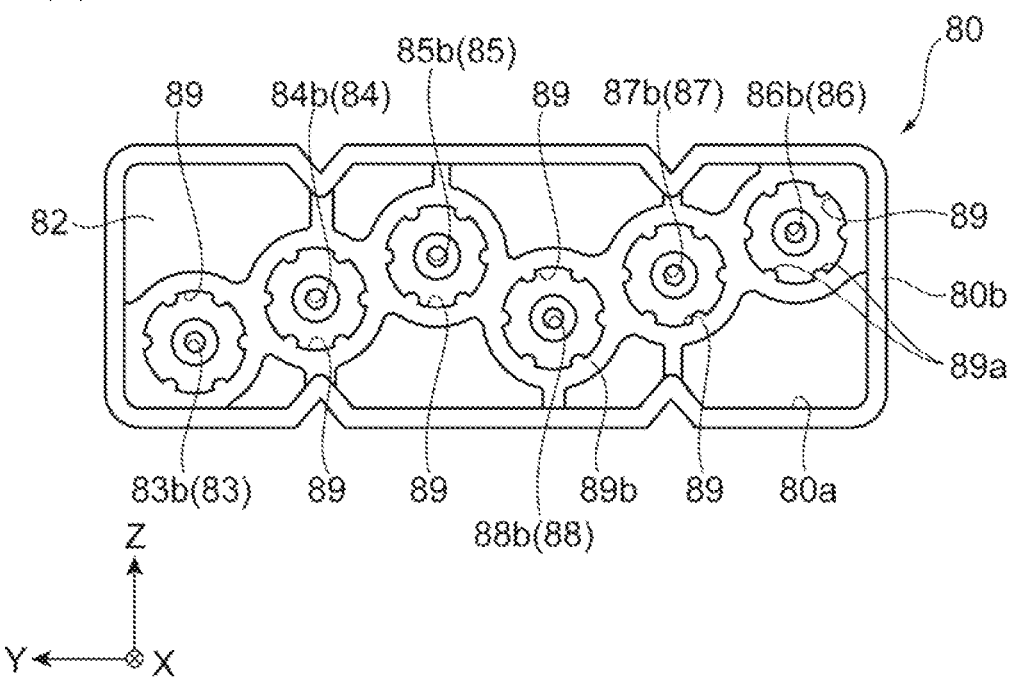

POWER STORAGE MODULE AND METHOD FOR MANUFACTURING POWER STORAGE MODULE

CROSS REFERENCE TO RELATED APPLICATIONS

This application is a National Stage of International Application No. PCT/JP2018/027151 filed Jul. 19, 2018, claiming priorities based on Japanese Patent Application No. 2017-185126 filed Sep. 26, 2017 and Japanese Patent Application No. 2018-009599 filed Jan. 24, 2018.

TECHNICAL FIELD

An aspect of the present disclosure relates to a power storage module and a method for manufacturing a power storage module.

BACKGROUND ART

Bipolar batteries (power storage modules) including bipolar electrodes, each of which has a positive electrode formed on one surface of a current collector and a negative electrode formed on the other surface, are known (refer to Patent Literature 1). In such a battery, an electrolytic solution is enclosed in an internal space defined by a separator, a current collector, and a seal member. Bipolar electrodes are laminated with an electrolyte layer constituted of the separator impregnated with the electrolytic solution therebetween. A tube penetrating the seal member is provided in the battery. One end of the tube faces the internal space, and the other end faces an external space of the battery. When the pressure of the internal space rises while the battery is in use, this tube functions as a pressure regulating valve.

CITATION LIST

Patent Literature

Patent Literature 1: Japanese Unexamined Patent Publication No. 2010-287451

SUMMARY OF INVENTION

Technical Problem

However, in the constitution disclosed in Patent Literature 1, it is necessary to attach tubes for each of respective internal spaces. Therefore, there is a problem that a constitution of a bipolar battery including tribes serving as pressure regulating valves becomes complicated.

An object of an aspect of the present disclosure is to provide a power storage module in which a constitution for performing pressure regulation of a plurality of internal spaces between bipolar electrodes can be simplified, and a method for manufacturing a power storage module.

Solution to Problem

According to an aspect of the present disclosure, there is provided a power storage module including a laminate constituted of a plurality of laminated bipolar electrodes, each of the bipolar electrodes including an electrode plate, a positive electrode provided on one surface of the electrode plate, and a negative electrode provided on the other surface of the electrode plate, wherein a plurality of internal spaces is formed between the bipolar electrodes adjacent to each other in the laminate; a frame body holding an edge portion of the electrode plate and provided with openings communicating with the plurality of internal spaces; and pressure regulating valve attached to the openings. The pressure regulating valve has a first member provided with a plurality of first communication holes respectively communicating with the plurality of internal spaces through the opening and attached to the openings, a second member provided with a plurality of second communication holes respectively communicating with the plurality of first communication holes and connected to a side surface of the first member on a side opposite to the opening side, the plurality of second communication holes having first opening ends on the first member side and second opening ends on a side opposite to the first opening ends, a plurality of elastic members closing the second opening ends, and a third member pressing the plurality of elastic members against the second member.

In this power storage module, the pressure regulating valve having the plurality of elastic members closing the opening ends (the second opening ends) on an outlet side of the plurality of communication holes (the first communication holes and the second communication holes communicating with the plurality of respective internal spaces is provided. That is, in order to perform pressure regulation of the plurality of internal spaces in the laminate having the bipolar electrodes, one pressure regulating valve common to the plurality of internal spaces is provided. Accordingly, the constitution for performing pressure regulation of the plurality of internal spaces between the bipolar electrodes can be simplified.

The power storage module may further include a plurality of the pressure regulating valves. The frame body may be provided with a plurality of the openings to which the plurality of pressure regulating valves are connected. The plurality of openings may communicate with the internal spaces differing from each other for each of the openings. Since the plurality of openings are provided in the frame body, it is possible to reduce the number of internal spaces in other words, the number of internal spaces as targets for performing pressure regulation using one pressure regulating valve, that is, the number of communication holes required to be provided for one pressure regulating valve) communicating with one opening, compared to a case where only one opening is provided. Accordingly, the cross-sectional area of the pressure regulating valve per communication hole can be increased, and air can circulate smoothly inside the communication holes.

Opening ends of the plurality of first communication holes on the opening side may be disposed point-symmetrically with respect to an axis passing through a center on a side surface of the first member on the opening side and orthogonal to the side surface. According to this constitution, in both two states (postures) of the first member (the pressure regulating valve) having an inverted relationship therebetween with respect to the axis, positional relationships between the openings of the frame body and the plurality of opening ends (the opening ends of the first communication holes on the opening side) become the same as each other. Therefore, in both the two foregoing states, the first member can be normally connected to the opening. As a result, the first member can be easily connected to the opening. In addition, it is possible to prevent occurrence of erroneous assembly as of the first member being connected to the opening in an erroneous direction.

Opening ends of the plurality of first communication holes on the second member side and the first opening ends of the plurality of second communication holes may be disposed point-symmetrically with respect to the axis. According to this constitution, in both two states (postures) of the first member (or the second member) having an inverted relationship therebetween with respect to the axis, positional relationships between the opening ends of the plurality of first communication holes on the second member side and the first opening ends of the plurality of second communication holes become the same as each other. Therefore, in both the two foregoing states, the second member can be normally joined to the first member. As a result, the second member can be easily joined to the first member. In addition, it is possible to prevent occurrence of erroneous assembly as of the second member being joined to the first member in an erroneous direction.

The elastic members may be formed to have pillar shapes. The second member may have a plurality of tubular portions respectively surrounding the second opening ends and accommodating the elastic members. The elastic members may be fixed to the tubular portions such that clearances are provided between inner surfaces of the tubular portions and the elastic members. According to this constitution, when the elastic members closing the second opening ends of the second communication holes communicating with the internal spaces are separated from the second opening ends in accordance with a pressure rise inside the internal spaces, gas inside the internal spaces can escape appropriately through the clearances between the elastic members and the tubular portions.

End surfaces of the tubular portions on the third member side may be separated from the third member. According to this constitution, gas which has escaped through the clearances between the elastic members and the tubular portions can further escape appropriately through spaces between the end surfaces of the tubular portions on the third member side and the third member.

The second member and the third member may be connected to each other such that an accommodation space accommodating the plurality of elastic members is formed. Exhaust ports allowing the accommodation space to communicate with an external space may be provided in the third member at positions not overlapping the elastic members when viewed in a connection direction of the first member and the second member. According to this constitution, gas which has been emitted from the internal spaces through the first communication holes and the second communication holes can be discharged appropriately to the external space through the exhaust ports without accumulating in the accommodation space between the second member and the third member.

The first member and the second member may be connected to each other with a partitioning wall extending in the connection direction of the first member and the second member therebetween such that each of a plurality of communication paths formed by the plurality of first communication holes and the plurality of second communication holes when viewed in the connection direction of the first member and the second member is partitioned. If the side surface of the first member on the second member side and a side surface of the second member on the first member side are subjected to surface-joining through welding, there is a risk that a joint part of a first communication hole and a second communication hole may be blocked due to the first member or the second member which has melted. On the other hand, according to a constitution in which the first member and the second member are joined to each other with the partitioning wall therebetween as described above (for example, a constitution welded through hot-plate welding), it is possible to reduce a risk that a joint part may be blocked due to the first member and the second member being joined to each other.

The plurality of second opening ends may be disposed in a manner of being shifted from each other in a direction intersecting a lamination direction of the laminate when viewed in the connection direction of the first member and the second member. In this constitution, a liquid junction between the plurality of second opening ends can be curbed.

Support portions supporting the plurality of elastic members may be provided on a surface of the third member on the second member side. In this constitution, a situation in which the elastic members are pressed by the third member in an inclined state is curbed.

The support portions may have tubular shapes accommodating the elastic members. In this constitution, since side surfaces of the elastic members are supported, a situation in which the elastic members incline can be curbed more reliably.

Holes recessed on the second member side may be formed on surfaces of the elastic members on the third member side. The support portions may have projecting shapes fitted into the holes of the elastic members. In this constitution, it is possible to reduce a load on the support portions received from the elastic members when the elastic members are compressed.

The first member may be integrally formed with the frame body. In this constitution, a step of joining the frame body and the first member can be omitted, and therefore this can contribute to improvement in productivity.

According to another aspect of the present disclosure, there is provided a method for manufacturing a power storage module having a plurality of bipolar electrodes, each of the bipolar electrodes including an electrode plate, a positive electrode provided on one surface of the electrode plate, and a negative electrode provided on the other surface of the electrode plate. The method for manufacturing a power storage module includes a step of obtaining a laminate by laminating the plurality of bipolar electrodes, wherein a plurality of internal spaces is formed between the bipolar electrodes adjacent to each other in the laminate; a step of filming a frame body holding an edge portion of the electrode plate and provided with an opening communicating with a plurality of internal spaces between the bipolar electrodes adjacent to each other in the laminate; a step of attaching a first member provided with a plurality of first communication holes respectively communicating with the plurality of internal spaces through the opening to the openings; a step of preparing a pressure regulating valve sub-module having a second member provided with a plurality of second communication holes, the plurality of second communication holes having first opening ends on the first member side and second opening ends on a side opposite to the first opening ends, a plurality of elastic members closing the second opening ends, and a third member pressing the plurality of elastic members against the second member; and a step of joining the first member and the second member of the pressure regulating valve sub-module to each other such that the first communication holes and the second communication holes communicate with each other.

In this method for manufacturing a power storage module, since the pressure regulating valve sub-module is joined to a member in which the first member is connected to the laminate and the frame bodies, one pressure regulating valve common to the plurality of internal spaces in the laminate can be easily mounted. Therefore, according to the manufacturing method, the constitution for performing pressure regulation of the plurality of internal spaces between the bipolar electrodes is simplified, and then a step of manufacturing a power storage module having this constitution can be simplified.

The method for manufacturing a power storage module may further include a step of injecting an electrolytic solution into the plurality of internal spaces through the plurality of first communication holes, after the connecting step and before the joining step. In this case, an electrolytic solution can be injected easily into each of the internal spaces in the laminate utilizing the plurality of first communication holes provided in the first member.

The method for manufacturing a power storage module may further include a step of inspecting an operation of the pressure regulating valve sub-module by sending air into the second communication holes from the first opening ends of the second communication holes, after the preparing step and before the joining step. In the joining step, the first member and the inspected second member of the pressure regulating valve sub-module may be joined to each other. In this case, before the pressure regulating valve sub-module is joined to the first member, an operation of the pressure regulating valve sub-module (for example, a valve opening pressure of each of the elastic members) can be inspected utilizing the plurality of second communication holes provided in the pressure regulating valve sub-module. As a result, it is possible to improve the yield of the power storage module which will be manufactured eventually.

In the method for manufacturing a power storage module, first joining projection portion extending in a connection direction of the first member and the second member may be provided on a side surface of the first member on a side connected to the second member such that each of the plurality of first communication holes is partitioned when viewed in the connection direction. Second joining projection portion extending in the connection direction may be provided on a side surface of the second member on a side connected to the first member such that each of the plurality of second communication holes is partitioned in association with the first joining projection portion when viewed in the connection direction. In the joining step, the first member and the second member may be joined to each other through hot-plate welding of end portion of the first joining projection portion and end portion of the second joining projection portion. Due to hot-plate welding between such projection portions, when the first member and the second member are joined to each other, it is possible to reduce a risk that a joint part of a first communication hole and a second communication hole may be blocked.

Effects of Invention

According to the aspect of the present disclosure, it is possible to provide a power storage module in which a constitution for performing pressure regulation of a plurality of internal spaces between bipolar electrodes can be simplified, and a method for manufacturing a power storage module.

BRIEF DESCRIPTION OF DRAWINGS

FIG. 7 is a view illustrating a base member FIG. 7(A) illustrates a side surface on a frame body opening side, and FIG. 7(B) illustrates a side surface on a case member side.

FIG. 9 is a view illustrating the case member FIG. 9(A) illustrates the side surface on the base member side, and FIG. 9(B) illustrates a side surface on a cover member side.

DESCRIPTION OF EMBODIMENTS

Figure 1:
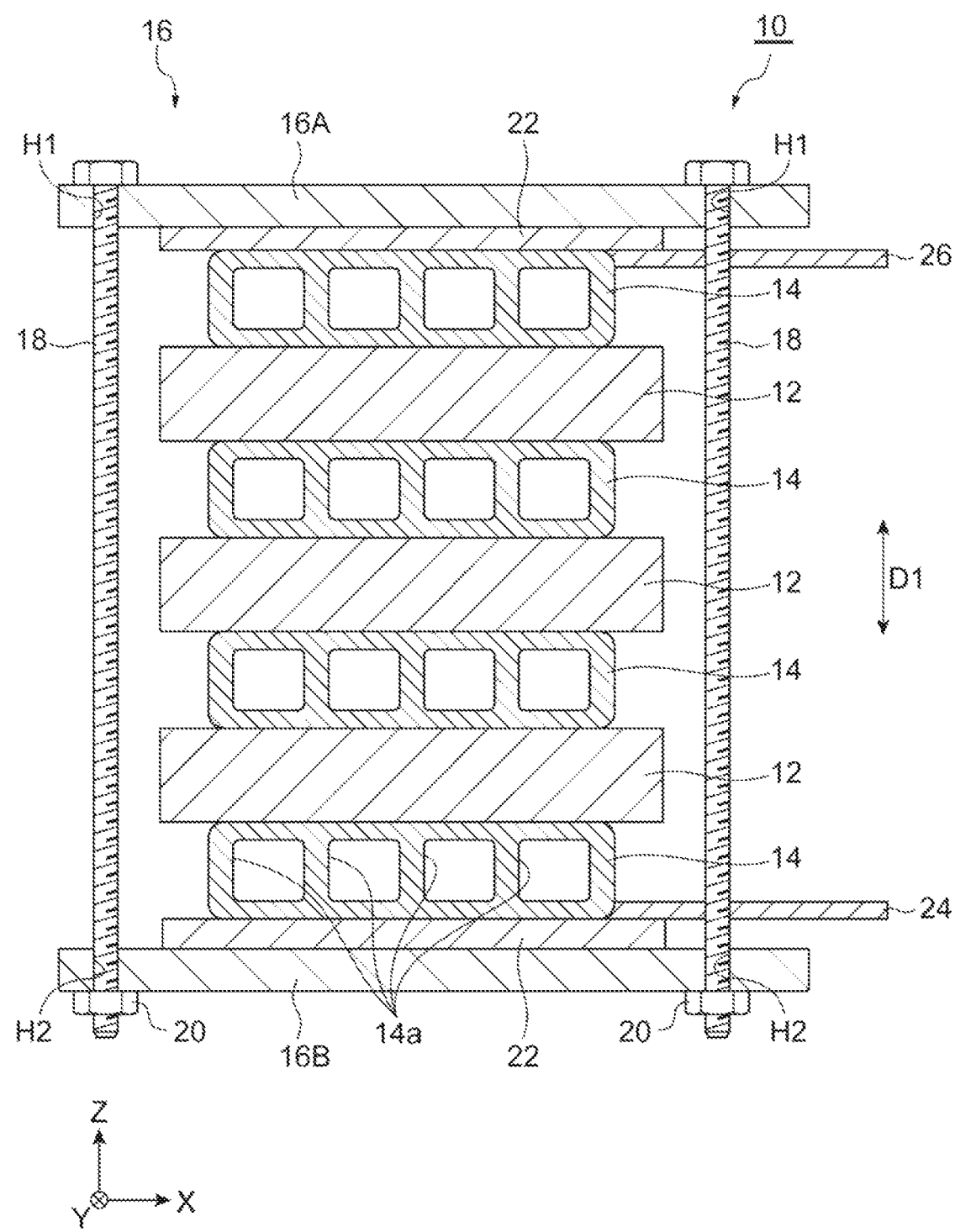
FIG. 1 is a schematic cross-sectional view illustrating an embodiment of a power storage device including a power storage module.

Hereinafter, examples of the present disclosure will be described in detail with reference to the accompanying drawings. In description of the drawings, the same reference signs are used for elements which are the same or equivalent, and duplicate description will be omitted. An XYZ orthogonal coordinate system is indicated in the drawings.

[Constitution of Power Storage Device]

FIG. 1 is a schematic cross-sectional view illustrating an embodiment of a power storage device including a power storage module. For example, a power storage device 10 illustrated in FIG. 1 is used as a battery for various kinds of vehicles such as forklifts, hybrid automobiles, and electric automobiles. The power storage device 10 includes a plurality (three in the present embodiment) of power storage modules 12, but it may include a single power storage module 12. For example, the power storage module 12 is a bipolar battery. For example, the power storage module 12 is a secondary battery such as a nickel-hydride secondary battery or a lithium-ion secondary battery, but it may be an electric double layer capacitor. In the following description, a nickel-hydride secondary battery will be described as an example.

For example, a plurality of power storage modules 12 can be laminated with conductive plates 14 such as metal plates therebetween. When viewed in a lamination direction D1, the power storage modules 12 and the conductive plates 14 have rectangular shapes, for example. Each of the power storage modules 12 will be described below in detail. The conductive plates 14 are respectively disposed on outward sides of the power storage modules 12 positioned at both ends of the power storage modules 12 in the lamination direction D1 (a Z direction). The conductive plate 14 is electrically connected to the adjacent power storage modules 12. Accordingly, the plurality of power storage modules 12 are connected in series in the lamination direction D1. In the lamination direction D1, a positive electrode terminal 24 is connected to the conductive plate 14 positioned at one end, and a negative electrode terminal 26 is connected to the conductive plate 14 positioned at the other end. The positive electrode terminal 24 may be integrated with the conductive plate 14 to be connected to. The negative electrode terminal 26 may be integrated with the conductive plate 14 to be connected to. The positive electrode terminal 24 and the negative electrode terminal 26 extend in a direction (an X direction) intersecting the lamination direction D1. The power storage device 10 can be charged and discharged using the positive electrode terminal 24 and the negative electrode terminal 26.

The conductive plates 14 can also function as heat dissipation plates for emitting heat generated in the power storage modules 12. When a refrigerant such as air passes through a plurality of voids 14a provided inside the conductive plates 14, heat from the power storage modules 12 can be efficiently emitted to the outside. For example, each of the voids 14a extends in a direction (a Y direction) intersecting the lamination direction D1. When viewed in the lamination direction D1, the conductive plates 14 are smaller than the power storage modules 12, but they may be the same as or larger than the power storage modules 12.

The power storage device 10 can include a restraint member 16 restraining the power storage module 12 and the conductive plate 14, which have been laminated alternately, in the lamination direction D1. The restraint member 16 includes a pair of restraint plates 16A and 16B, and interlocking members (bolts 18 and nuts 20) for interlocking the restraint plates 16A and 16B with each other. For example, insulation films 22 such as resin films are respectively disposed between the restraint plates 16A and 16B and the conductive plates 14. For example, each of the restraint plates 16A and 16B is constituted of a metal such as iron. When viewed in the lamination direction D1, each of the restraint plates 16A and 16B and the insulation films 22 have rectangular shapes, for example. The insulation films 22 are larger than the conductive plates 14, and each of the restraint plates 16A and 16B is larger than the power storage modules 12. When viewed in the lamination direction D1, insertion holes H1, through which shaft portions of the bolts 18 are inserted, are provided in edge portions of the restraint plate 16A at positions on the outward sides of the power storage modules 12. Similarly, when viewed in the lamination direction D1, insertion holes H2, through which the shaft portions of the bolts 18 are inserted, are provided in edge portions of the restraint plate 16B at positions on the outward sides of the power storage modules 12. In a case where each of the restraint plates 16A and 16B has a rectangular shape when viewed in the lamination direction D1, the insertion holes H1 and the insertion holes H2 are positioned in corner portions of the restraint plates 16A and 16B.

The restraint plate 16A on one side is brought into contact with the conductive plate 14 connected to the negative electrode terminal 26 with the insulation film 22 therebetween, and the restraint plate 16B on the other side is brought into contact with the conductive plate 14 connected to the positive electrode terminal 24 with the insulation film 22 therebetween. For example, the bolts 18 pass through the insertion holes H1 from a side of the restraint plate 16A on one side toward a side of the restraint plate 16B on, the other side. The nuts 20 are screwed into tips of the bolts 18 protruding from the restraint plate 16B on the other side. Accordingly, the insulation films 22, the conductive plates 14, and the power storage modules 12 are sandwiched as a unit, and a restraint load is applied in the lamination direction D1.

Figure 2:
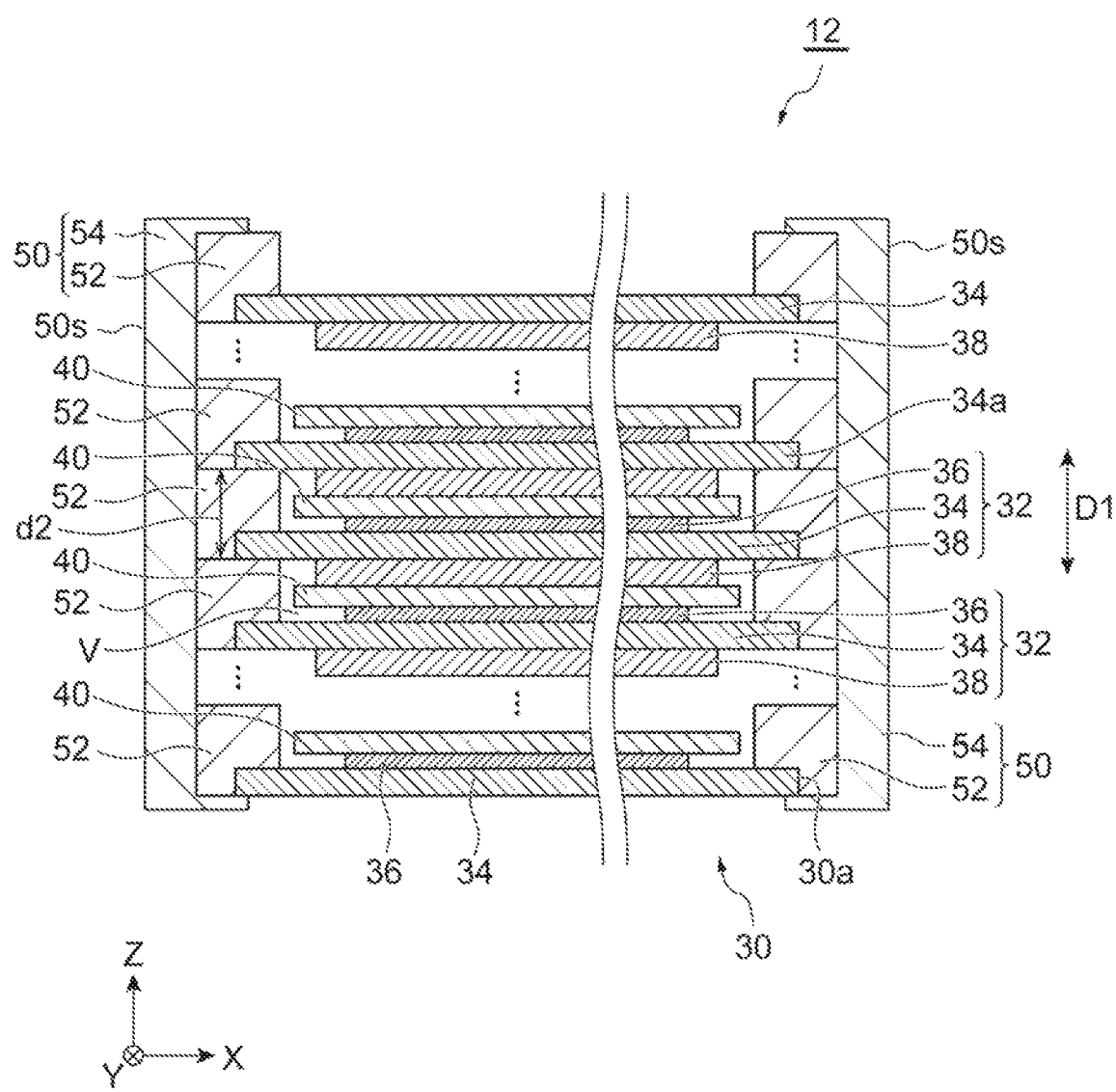
FIG. 2 is a schematic cross-sectional view illustrating the power storage module constituting the power storage device in FIG. 1.

FIG. 2 is a schematic cross-sectional view illustrating the power storage module constituting the power storage device in FIG. 1. The power storage module 12 illustrated in FIG. 2 includes a laminate 30 in which a plurality of bipolar electrodes (electrodes) 32 are laminated. When viewed in the lamination direction D1 of the bipolar electrodes 32, the laminate 30 has a rectangular shape, for example. A separator 40 can be disposed between the bipolar electrodes 32 adjacent to each other. The bipolar electrode 32 includes an electrode plate 34, a positive electrode 36 provided on one surface of the electrode plate 34, and a negative electrode 38 provided on the other surface of the electrode plate 34. In the laminate 30, the positive electrode 36 of one bipolar electrode 32 faces the negative electrode 38 of the bipolar electrode 32 on one side adjacent in the lamination direction D1 with the separator 40 interposed therebetween, and the negative electrode 38 of one bipolar electrode 32 faces the positive electrode 36 of the bipolar electrode 32 on the other side adjacent in the lamination direction D1 with the separator 40 interposed therebetween. In the lamination direction D1, the electrode plate 34 (a negative electrode-side end terminal electrode) in which the negative electrode 38 is disposed on an inner surface is disposed at one end of the laminate 30, and the electrode plate 34 (a positive electrode-side end terminal electrode) in which the positive electrode 36 is disposed on an inner surface is disposed at the other end of the laminate 30. The negative electrode 38 of the negative electrode-side end terminal electrode faces the positive electrode 36 of the bipolar electrode 32 in the uppermost layer with the separator 40 therebetween. The positive electrode 36 of the positive electrode-side end terminal electrode faces the negative electrode 38 of the bipolar electrode 32 in the lowermost layer with the separator 40 therebetween. The electrode plates 34 (end terminal electrodes) are respectively connected to the adjacent conductive plates 14 (refer to FIG. 1).

The power storage module 12 includes frame bodies 50 each of which holds an edge portion 34a of the electrode plate 34 on a side surface 30a of the laminate 30 extending in the lamination direction D1. The frame bodies 50 are provided around the laminate 30 when viewed in the lamination direction D1. That is, the frame bodies 50 are constituted such that the side surface 30a of the laminate 30 is surrounded. The frame body 50 can include a first resin portion 52 holding the edge portion 34a of the electrode plate 34, and a second resin portion 54 provided around the first resin portion 52 when viewed in the lamination direction D1.

The first resin portion 52 constituting an inner wall of the frame body 50 is provided throughout an end surface of the electrode plate 34 in the edge portion 34a from one surface (a surface on which the positive electrode 36 is formed) of the electrode plate 34 of each of the bipolar electrodes 32. When viewed in the lamination direction D1, each of the first resin portions 52 is provided throughout the entire circumference of the edge portion 34a of the electrode plate 34 of each of the bipolar electrodes 32. The adjacent first resin portions 52 abut each other on a surface extending outward from the other surface (a surface on which the negative electrode 38 is formed) of the electrode plate 34 of each of the bipolar electrodes 32. As a result, the edge portion 34a of the electrode plate 34 of each of the bipolar electrodes 32 is embedded and held in the first resin portion 52. Similar to the edge portion 34a of the electrode plate 34 of each of the bipolar electrodes 32, the edge portions 34a of the electrode plates 34 disposed at both ends of the laminate 30 are also held in a state of being embedded in the respective first resin portions 52. Accordingly, an internal space V air-tightly partitioned by the electrode plates 34 and 34 and the first resin portion 52 is formed between the electrode plates 34 and 34 adjacent to each other in the lamination direction D1. For example, an electrolytic solution (not illustrated) constituted of an alkaline solution such as a potassium hydroxide aqueous solution is accommodated in the internal space V.

The second resin portion 54 constituting outer walls of the frame bodies 50 is a tubular portion extending in the lamination direction D1 as its axial, direction. The second resin portion 54 extends throughout the overall length of the laminate 30 in the lamination direction D1. The second resin portion 54 covers outer surfaces of the first resin portions 52 extending in the lamination direction D1. The second resin portion 54 is welded to the first resin portions 52 on an inward side when viewed in the lamination direction D1.

For example, the electrode plate 34 is a rectangular metal foil made of nickel. The edge portion 34a of the electrode plate 34 formed to be a non-coated region not coated with a positive electrode active material and a negative electrode active material, and the non-coated region becomes a region embedded and held by the first resin portion 52 constituting the inner wall of the frame body 50. Examples of the positive electrode active material constituting the positive electrode 36 include nickel hydroxide. Examples of the negative electrode active material constituting the negative electrode 38 include a hydrogen storage alloy. A formation region of the negative electrode 38 on the other surface of the electrode plate 34 is slightly larger than a formation region of the positive electrode 36 on one surface of the electrode plate 34.

For example, the separator 40 is formed to have a sheet shape. Examples of a material forming the separator 40 include a porous film constituted of a polyolefin resin such as polyethylene (PE) or polypropylene (PP), or woven fabric or non-woven fabric constituted of polypropylene or the like. In addition, the separator 40 may be reinforced using a vinylidene fluoride resin compound or the like. The separator 40 is not limited to a sheet shape, and a bag-shaped separator may be used.

For example, the frame body 50 (the first resin portion 52 and the second resin portion 54) is formed to have a rectangular tube shape through injection molding using an insulative resin. Examples of a resin material constituting the frame body 50 include polypropylene (PP), polyphenylene sulfide (PPS), or modified polyphenylene ether (modified PPE).

Figure 3:
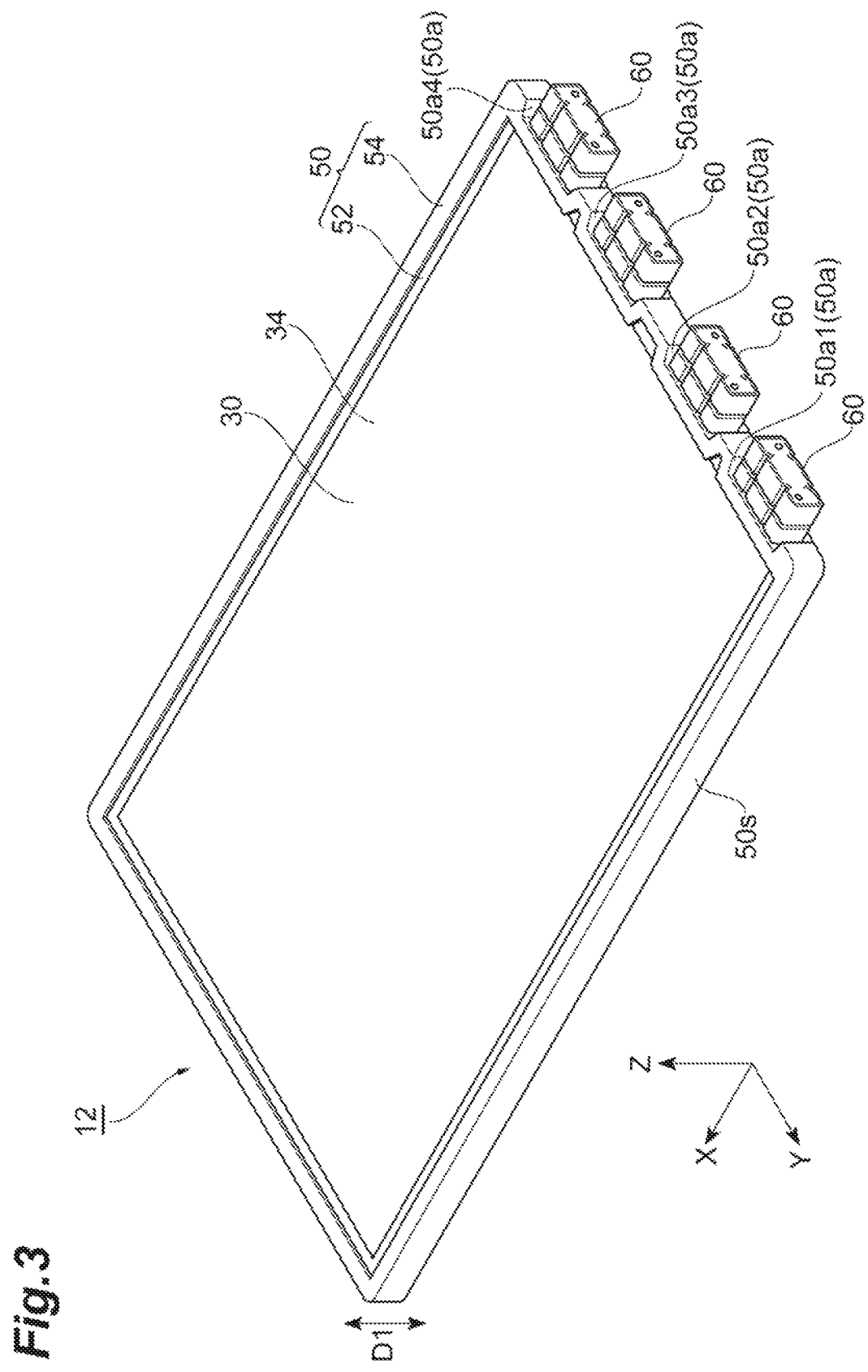
FIG. 3 is a perspective view illustrating the power storage module in FIG. 2.
Figure 4:
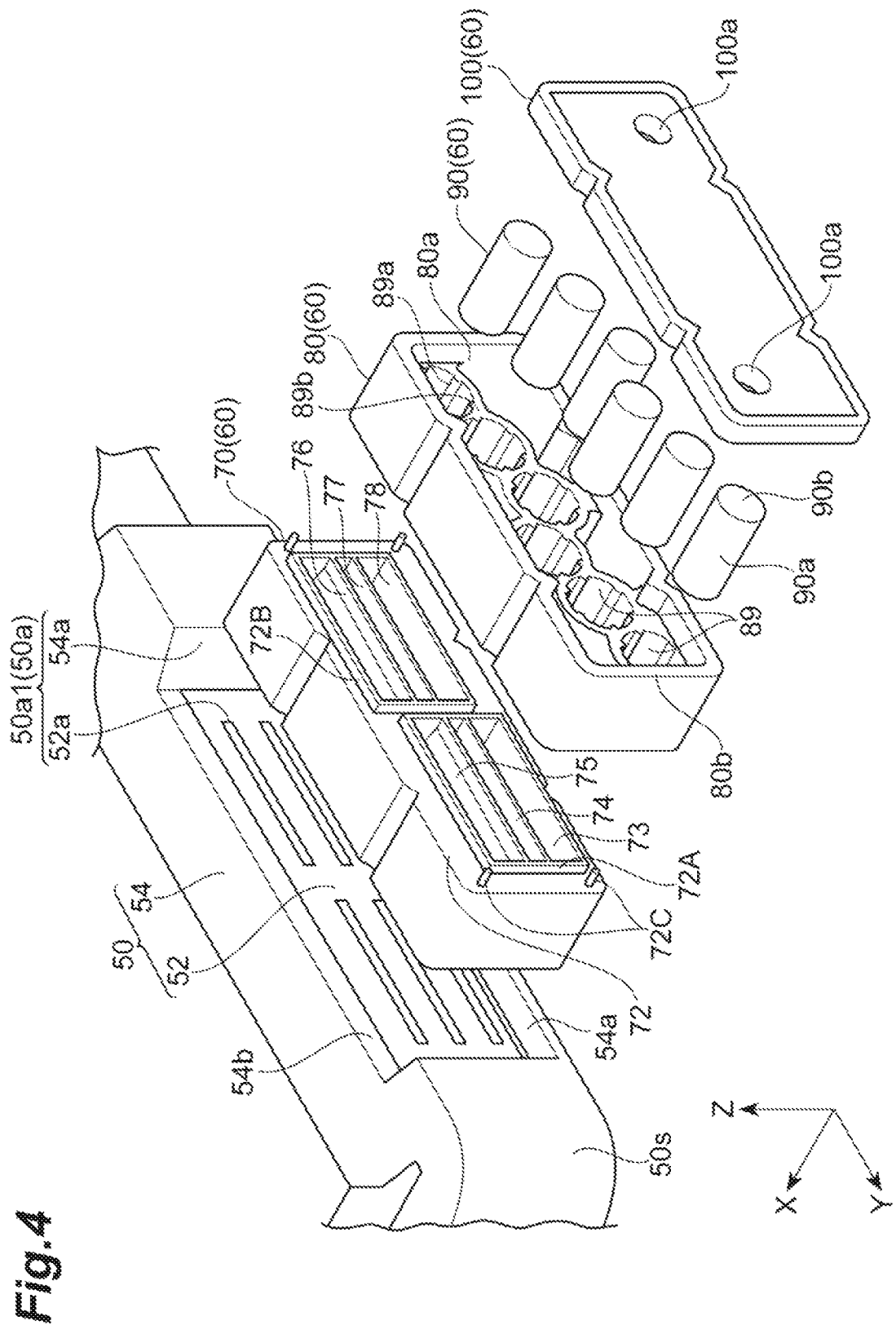
FIG. 4 is an exploded perspective view of a pressure regulating valve connected to an opening of a frame body.

FIG. 3 is a schematic perspective view illustrating the power storage module 12 in FIG. 2. FIG. 4 is an exploded perspective view of a pressure regulating valve 60 connected to an opening 50a of the frame body 50. As illustrated in FIGS. 3 and 4, the frame body 50 of the power storage module 12 has a side surface 50s extending in the lamination direction D1. The side surface 50s is a surface positioned on the outward side when viewed in the lamination direction D1.

Thus, the second resin portion 54 has the side surface 50s of the frame body 50.

When viewed in the lamination direction D1, a plurality (here, four) of openings 50a (openings 50a1 to 50a4) are provided on one side surface 50s (here, one side surface 50s directed in a longitudinal direction (the X direction) of the frame body 50) forming one side of the frame body 50. Each of the openings 50a functions as an injection port for injecting an electrolytic solution into each of the internal spaces V, and it functions as a connection port for the pressure regulating valve 60 after an electrolytic solution is injected.

As illustrated in FIG. 4, one opening 50a is constituted of a first opening 52a provided in the first resin portion 52, and a second opening 54a provided in the second resin portion 54. Each of the first openings 52a communicates with the internal space V between the bipolar electrodes 32 adjacent to each other. A plurality (here, six) of first openings 52a are provided in the first resin portion 52, and a single second opening 54a expanding such that the plurality of first openings 52a are covered is provided in the second resin portion 54. The first opening 52a may be provided in each of the first resin portions 52 or may be provided between the first resin portions 52 adjacent to each other. The shape of each of the first openings 52a and the second openings 54a is a rectangular shape, for example. In the present embodiment, a cutout portion 54b allowing entry of a base member 70 of the pressure regulating valve 60 is formed in an upper portion of the second opening 54a.

Figure 5:
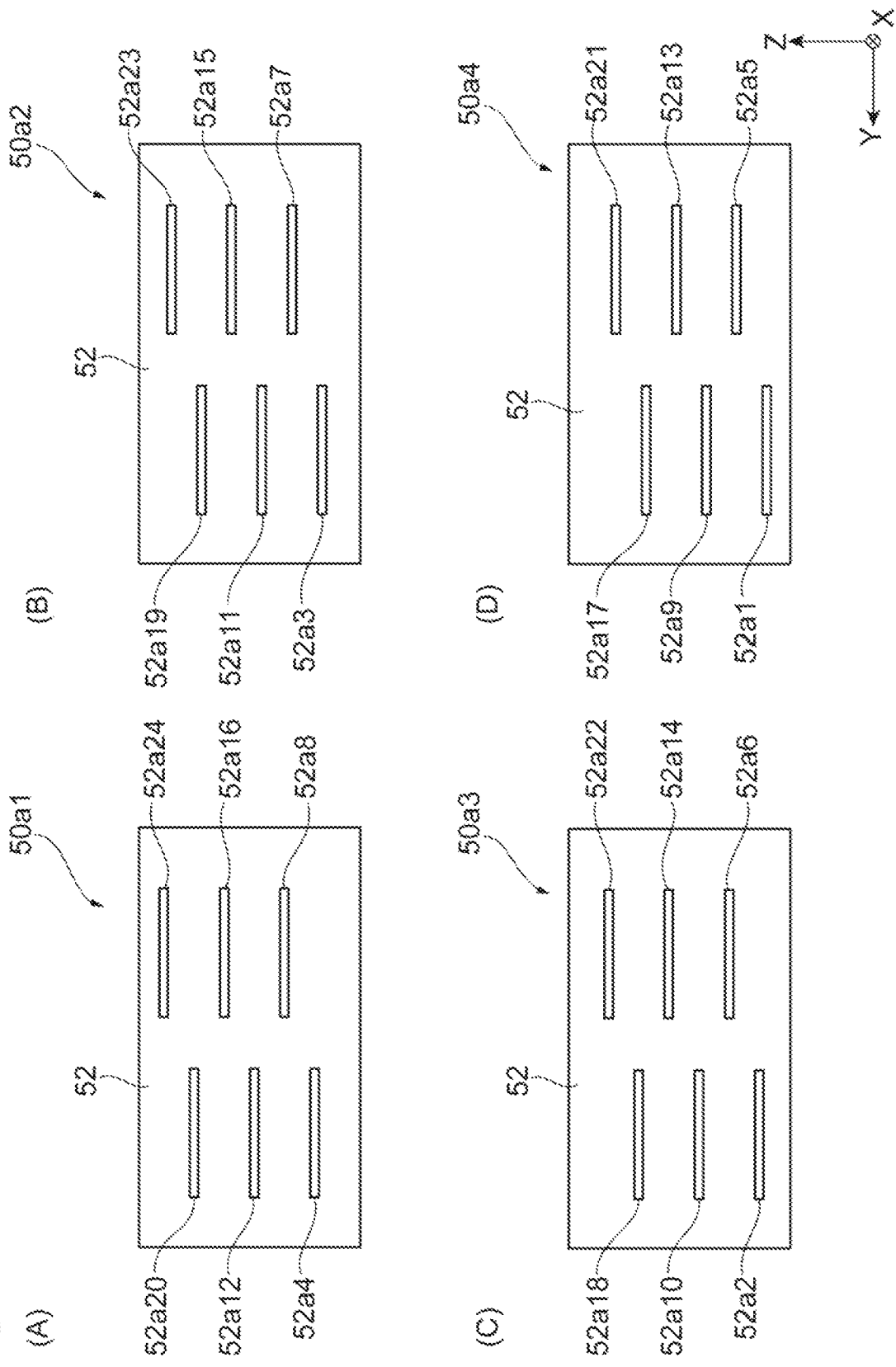
FIG. 5 is a schematic view illustrating each of the openings of the frame body.

FIG. 5 is a view (a view in the X direction) illustrating each of the openings 50a1 to 50a4. In FIG. 5, illustration of the second resin portion 54 around the first resin portion 52 is omitted. In the present embodiment, 24 internal spaces V are formed in the power storage module 12, and one opening 50a communicates with six internal spaces V whose height positions in the lamination direction D1 are shifted by four stages. Each of the internal spaces. V communicates with any one of the four openings 50a1 to 50a4. As illustrated in FIG. 5, in one opening 50a, six first openings 52a are disposed in a manner of being divided into two rows in a width direction (the Y direction) of the frame body 50. In each row, three first openings 52a are disposed along the lamination direction D1 (the Z direction).

For example, disposition of the first openings 52a in each of the openings 50a can be constituted such that sets of the internal spaces V communicating with each other are shifted by one stage. In the following description, for the sake of convenience, in order to identify the 24 internal spaces V, they will be indicated as internal spaces V1 to V24 in the order from the other end (which is illustrated on the lower side in FIG. 2) toward one end (which is illustrated on the upper side in FIG. 2) of the laminate 30.

As illustrated in (A) of FIG. 5, in a first row (a row illustrated on the left side, the same applies hereinafter) of the opening 50a1, first openings 52a4, 52a12, and 52a20 communicating with the internal spaces V4, V12, and V20 are provided. In a second row (a row illustrated on the right side, the same applies hereinafter) of the opening 50a1, first openings 52a8, 52a16, and 52a24 communicating with the internal spaces V8, V16, and V24 are provided.

As illustrated (B) of FIG. 5, in a first row of the opening 50a2, first openings 52a3, 52a11, and 52a19 communicating with the internal spaces V3, V11, and, V19 are provided. In a second row of the opening 50a2, first openings 52a7, 52a15, and 52a23 communicating with the internal spaces V7, V15, and V23 are provided.

As illustrated in (C) of FIG. 5, in a first row of the opening 50a3, first openings 52a2, 52a10, and 52a18 communicating with the internal spaces V2, V10, and V18 are provided. In a second row of the opening 50a3, first openings 52a6, 52a14, and 52a22 communicating with the internal spaces V6, V14, and V22 are provided.

As illustrated in (D) of FIG. 5, in a first row of the opening 50a4, first openings 52a1, 52a9, and 52a17 communicating with the internal spaces V1, V9, and V17 are provided. In a second row of the opening 50a4, first openings 52a5, 52a13, and 52a21 communicating with the internal spaces V5, V13, and V21 are provided.

According to the disposition (that is, association between the first openings 52a1 to 52a24 and the internal spaces V1 to V24) of the first openings 52a as described above, a constitution in which all the internal spaces V communicate with the first openings 52a different from each other is realized.

Figure 6:
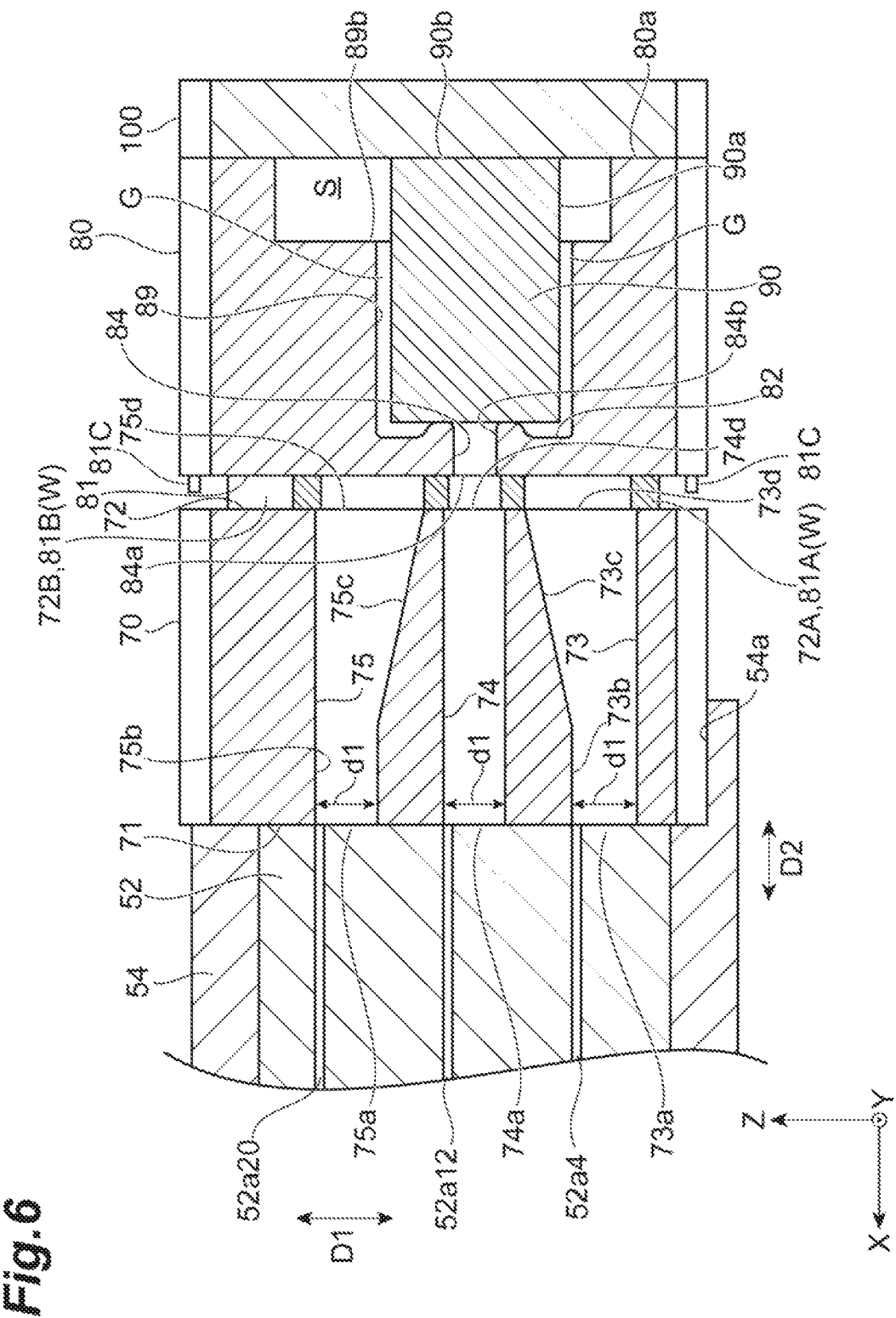
FIG. 6 is a schematic cross-sectional view illustrating a constitution of the pressure regulating valve.

Subsequently, with reference to FIGS. 4 and 6 to 9, a constitution of the pressure regulating valve 60 connected to the opening 50a of the frame body 50 will be described. FIG. 6 is a schematic cross-sectional view illustrating a constitution of the pressure regulating valve 60. FIG. 6 is a cross-sectional view including a cross section of communication paths (communication paths formed by the first opening 52a12, a first communication hole 74, and a second communication hole 84) associated with the internal space V12. As illustrated in FIGS. 4 and 6, the pressure regulating valve 60 has the base member 70 (a first member), a case member 80 (a second member), a plurality (here, six) of valve bodies 90 (elastic members), and a cover member 100 (a third member).

The base member 70 has a substantially rectangular parallelepiped external shape and is formed of polypropylene (PP), polyphenylene sulfide (PPS), or modified polyphenylene ether (modified PPE), for example. The base member 70 is connected to the openings 50a. When viewed in the X direction, a lower surface and both side surfaces of the base member 70 are positioned by the second opening 54a, For example, the base member 70 is fixed to the openings 50a through welding of a part or all of a contact part between a side surface 71 and the first resin portion 52. Welding of the side surface 71 and the first resin portion 52 is performed through hot-plate welding, laser transmission welding, or ultrasonic welding, for example.

The diagram (A) of FIG. 7 is a plan view illustrating the side surface 71, and the diagram (B) of FIG. 7 is a plan view illustrating a side surface 72 (a first side surface) of the base member 70. The side surface 72 is a side surface on a side opposite to the opening 50a side and faces the case member 80. As illustrated in FIGS. 6 and 7, a plurality (here, six) of first communication holes 73 to 78 penetrating the base member 70 from the side surface 71 to the side surface 72 are provided in the base member 70. The first communication holes 73 to 78 are communication holes communicating with the first openings 52a4, 52a12, 52a20, 52a24, 52a16, and 52a8. The constitutions of the first communication holes 76 to 78 are similar to the constitutions of the first communication holes 73 to 75. Specifically, the first communication holes 76 to 78 pass through the centers on the side surfaces 71 and 72 and are constituted point-symmetrically with the first communication holes 73 to 75 with respect to an axis A orthogonal to the side surfaces 71 and 72. Accordingly, in the following description, the first communication holes 73 to 75 will be described, and description of the first communication holes 76 to 78 be omitted.

The first communication hole 74 positioned in a middle stage is formed to have a rectangular parallelepiped shape extending in the X direction.

The first communication hole 73 positioned in a lower stage has a communication portion 73b having a rectangular parallelepiped shape extending in the X direction, and a tapered portion 73c formed to have a tapered shape in which a vertical width (a width in the Z direction) increases as it goes toward the case member 80 in the X direction. The tapered portion 73c is provided such that a gap between the first communication holes 73 and 74 is reduced as it goes toward the case member 80 in the X direction. The communication portion 73b forms a section from an opening end 73a of the first communication hole 73 on the opening 50a side to an intermediate position of the first communication hole 73, and the tapered portion 73c forms a section from the intermediate position to an opening end 73d of the first communication hole 73 on the case member 80 side. The tapered portion 73c plays a role of regulating a position for allowing the first communication hole 73 and a second communication hole 83 provided in the case member 80 to communicate with each other.

The first communication hole 75 positioned in an upper stage has a communication portion 75b having a rectangular parallelepiped shape extending in the X direction, and a tapered portion 75c formed to have a tapered shape in which a vertical width (a width in the Z direction) increases as it goes toward the case member 80 in the X direction. The tapered portion 75c is provided such that a gap between the first communication holes 74 and 75 is reduced as it goes toward the case member 80 in the X direction. The communication portion 75b forms a section from an opening end 75a of the first communication hole 75 on the opening 50a side to an intermediate position of the first communication hole 75, and the tapered portion 75c forms a section from the intermediate position to an opening end 75d of the first communication hole 75 on the case member 80 side. The tapered portion 75c plays a role of regulating a position for allowing the first communication hole 75 and a second communication hole 85 provided in the case member 80 to communicate with each other.

When viewed in the X direction, the opening ends 73a to 75a of the first communication holes 73 to 75 are formed to have sizes including the first openings 52a4, 52a12, and 52a20. All vertical widths d1 of the opening ends 73a to 75a are the same as each other.

Six first openings 52a in the openings 50a1 to 50a4 are disposed such that they are shifted by one stage as described above. Therefore, in order to use the pressure regulating valves 60 having the same specifications (common shapes) for all the openings 50a1 to 50a4, even when the base member 70 of the pressure regulating valve 60 is connected to any of the openings 50a1 to 50a4, the first communication holes 73 to 78 are required to communicate with the associated first openings 52a. For example, the first communication hole 73 of the base member 70 communicates with the first opening 52a4. However, when the base member 70 is connected to the opening 50a2, the first communication hole 73 is required to communicate with the first opening 52a3. When the base member 70 is connected to the opening 50a3, the first communication hole 73 is required to communicate with the first opening 52a2. When the base member 70 is connected to the opening 50a4, the first communication hole 73 is required to communicate with the first opening 52a1.

Here, in the present embodiment, the vertical widths d1 of the opening ends 73a to 75a are set to be equal to or larger than a multiplication value of a width (that is, the width shifted by one stage described above) as wide as one of repetitive structures in the laminate 30 and the number of openings 50a. In the present embodiment, the width as wide as one of repetitive structures in the laminate 30 is a width d2 (refer to FIG. 2) of a part including one electrode plate 34 and one internal space V in the lamination direction D1. That is, in the present embodiment, a relationship of "d1≥d2×4" is established. Accordingly, even when the base member 70 is connected to any of the openings 50a1 to 50a4, the associated first opening 52a is settled on the inward side of each of the opening ends 73a to 75a when viewed in the X direction. As a result, the same base member 70 (that is, the same pressure regulating valve 60) can be used for any of the openings 50a1 to 50a4. Accordingly, the kinds of required members can be reduced. In addition, it is no longer necessary to use the pressure regulating valves 60 having specifications different from each other for the respective openings 50a. Therefore, it is also possible to prevent occurrence of erroneous assembly as of a pressure regulating valve 60 having unsuitable specifications being connected to the opening 50a.

Moreover, as illustrated in (A) of FIG. 7, a plurality of opening ends 73a to 78a pass through the center on the side surface 71 and are disposed point-symmetrically with respect to the axis A orthogonal to the side surface 71. According to this constitution, in both two states (postures) of the base member 70 having an inverted relationship therebetween with respect to the axis A, positional relationships between the openings 50a and a plurality of opening ends become the same as each other. Therefore, in both the two foregoing states, the base member 70 can be normally connected to the openings 50a. Specifically, even when the base member 70 is inverted (rotated by 180 degrees) from the state illustrated in (A) of FIG. 7 while having the axis A as a rotation axis, the base member 70 can be connected to the opening 50a1. For example, the first communication hole 73 which has been in communication with the first opening 52a4 communicates with the first opening 52a24 in a state after being inverted as described above. As a result, the base member 70 can be easily connected to the openings 50a. In addition, it is possible to prevent occurrence of erroneous assembly as of the base member 70 being connected to the openings 50a in an erroneous direction.

As illustrated in (B) of FIG. 7, first joining projection portions 72A and 72B extending in a connection direction D2 are provided on the side surface 72 of the base member 70 such that each of the plurality of first communication holes 73 to 78 is partitioned when viewed in the connection direction D2 (that is, the X direction) of the base member 70 and the case member 80.

The first joining projection portion 72A has four wall portions 72A1 standing upright in respective edge portions extending in the Y direction of the rectangular opening ends 73d to 75d, and two wall portions 72A2 standing upright in respective edge portions extending in the Z direction of the opening ends 73d to 75d. Similarly, the first joining projection portion. 72B has four wall portions 72B1 standing upright in respective edge portions extending in the Y direction of rectangular opening ends 76d to 78d, and two wall portions 72B2 standing upright in respective edge portions extending in the Z direction of the opening ends 76d to 78d.

In addition, pillar first measurement projection portions 72C extending in the connection direction D2 are provided at four corners on the side surface 72. The first measurement projection portions 72C are provided such that they do not interfere with the second joining projection portions 81A and 81B and second measurement projection portions 81C of the case member 80, which will be described below. That is, the first measurement projection portions 72C are provided at positions not overlapping the second joining projection portions 81A and 81B and the second measurement projection portions 81C when viewed in the connection direction D2.

Figure 8:
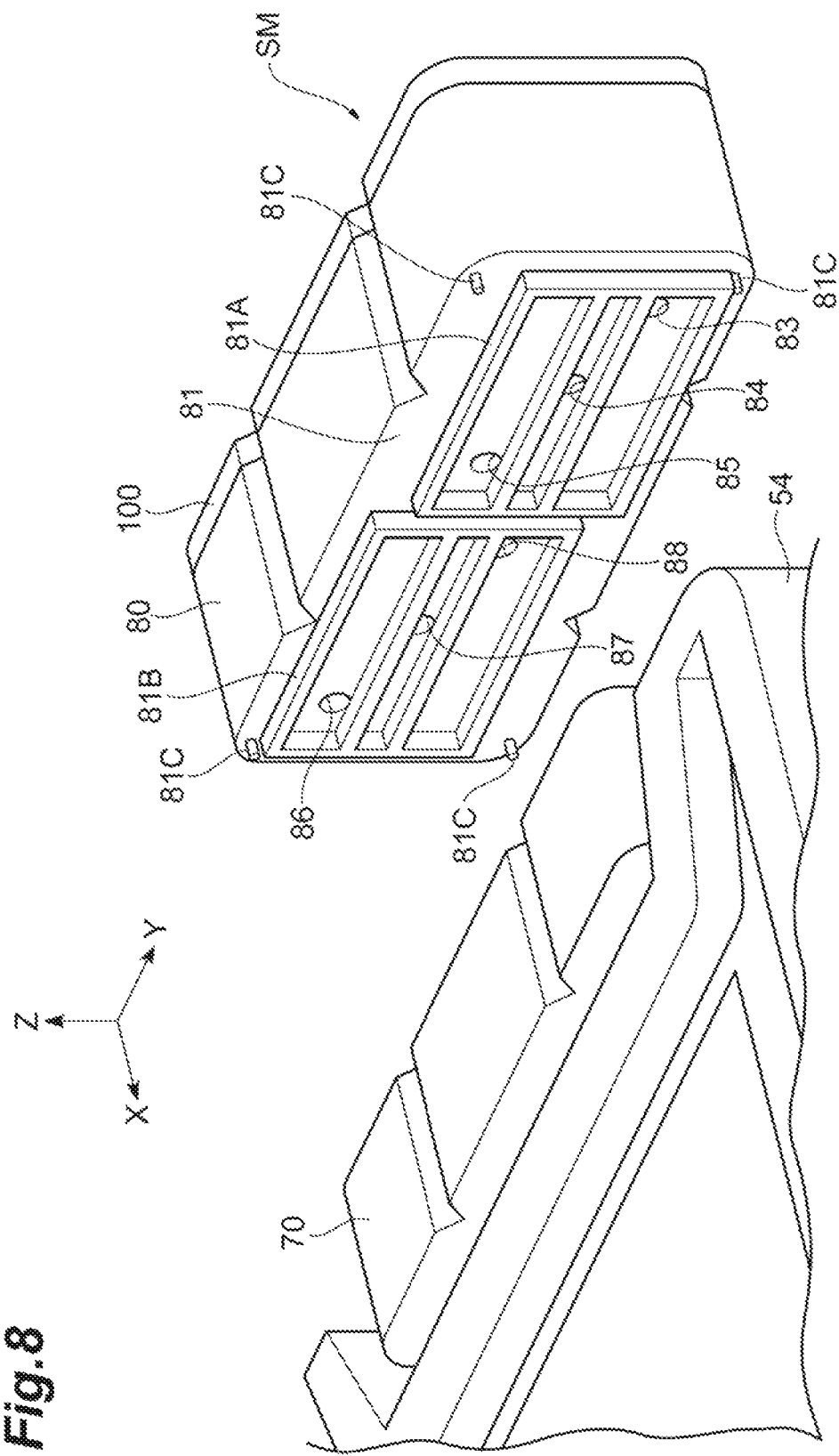
FIG. 8 is an exploded perspective view illustrating a side surface of the case member on the base member side.

The case member 80 is a box-like member having a substantially rectangular parallelepiped external shape and is formed of polypropylene (PP), polyphenylene sulfide (PPS), or modified polyphenylene ether (modified PPE), for example. The case member 80 is joined to the side surface 72 of the base member 70 on a side surface 81 (a second side surface corresponding to a bottom surface of a box. FIG. 8 is an exploded perspective view illustrating the side surface 81 of the case member 80. The diagram (A) of FIG. 9 is a plan view illustrating the side surface 81, and the diagram (B) of FIG. 9 is a plan view of the case member 80 viewed from the cover member 100 side.

As illustrated in FIGS. 8 and 9, a plurality (here, six) of second communication holes 83 to 88 penetrating the case member 80 from the side surface 81 to an inner surface 82 (an inner surface of a side plate forming the side surface S1) are provided in the case member 80. The second communication holes 83 to 88 are formed to have columnar shapes. Each of the second communication holes 83 to 88 communicates with one internal space V through each of the associated first communication holes 73 to 78.

As illustrated in FIG. 8 and (A) of FIG. 9, the second joining projection portions 81A and 81B extending in the connection direction D2 are provided an the side surface 81 of the case member 80 such that each of the plurality of second communication holes 83 to 88 is partitioned when viewed in the connection direction D2 (the X direction).

The second joining projection portions 81A and 81B have shapes associated with the first joining projection portions 72A and 12B and are provided such that they overlap the first joining projection portions 72A and 72B when viewed in the connection direction D2. That is, the second joining projection portion 81A has four wall portions 81A1 associated with the four wall portions 72A1, and two wall portions 81A2 associated with the two wall portions 72A2.

The second joining projection portion 81B has four wall portions 81B1 associated with the four wall portions 72B1, and two wall portions 81B2 associated with the two wall portions 72B2.

In addition, the pillar second measurement projection portions 81C extending in the connection direction D2 are provided at four corners on the side surface 81. The second measurement projection portions 81C are provided such that they do not interfere with the first joining, projection portions 72A and 72B and the first measurement projection portions 72C. That is, the second measurement projection portions 81C are provided at positions not overlapping the first joining projection portions 72A and 72B and the first measurement projection portions 72C when viewed in the connection direction D2.

The base member 70 and the case member 80 are joined to each other through hot-plate welding of end portions of the first joining projection portions 72A and 72B and end portions of the second joining projection portions 81A and 81B. Accordingly, the side surface 72 of the base member 70 and the side surface 81 of the case member 80 are connected to each other with a partitioning wall W extending in the connection direction D2 therebetween such that each of the plurality of communication paths formed by the plurality of first communication holes 73 to 78 and the plurality of second communication holes 83 to 88 is partitioned when viewed in the connection direction D2. The partitioning wall W is a wall portion formed such that the side surface 72 and the side surface 81 are connected to each other through hot-plate welding of the first joining projection portions 72A and 72B and the second joining projection portions 81A and 81B.

In the hot-plate welding, a hot plate is pressed against the end portions of the first joining projection portions 72A and 72B in a parallel manner. At this time, a hot plate is similarly pressed against the end portions of the first measurement projection portions 72C, so that the end portions of the first measurement projection portions 72C are in a solid state after melting through the hot-plate welding. Similarily, in the hot-plate welding, a hot plate is pressed against the end portions of the second joining projection portions 81A and 81B in a parallel manner. At this time, a hot plate is similarly pressed against the end portions of the second measurement projection portions 81C, so that the end portions of the second measurement projection portions 81C are in a solid state after melting through the hot-plate welding.

As illustrated in (B) of FIG. 7 and (A) of FIG. 9, all the plurality of opening ends 73d to 78d provided on the side surface 72 of the base member 70 and the plurality of opening ends 83a to 88a (the first opening ends) provided on the side surface 81 of the case member 80 are disposed point-symmetrically with respect to the axis A. In addition, the first joining projection portions 72A and 72B and the second joining projection portions 81A and 81B are also disposed point-symmetrically with respect to the axis A. On the other hand, the first measurement projection portions 72C and the second measurement projection portions 81C are disposed such that they are not point-symmetrical with each other with respect to the axis A. As illustrated in (B) of FIG. 7, in the present embodiment, the first measurement projection portions 72C are provided at four corners on the side surface 72 in an edge portion a side of a short side) in the Z axis direction. On the other hand, as illustrated in (A) of FIG. 9, in the present embodiment, the second measurement projection portions 81C are provided at four corners on the side surface 81 in an edge portion (a side of a long side) in the Y axis direction. In this manner, the first measurement projection portions 72C and the second measurement projection portions 81C are disposed such that they do not overlap each other when viewed in the connection direction D2 even if the case member 80 is vertically inverted (rotated by 180 degrees around the axis A) with respect to the base member 70.

According to the constitution, in both two states (postures, of the base member 70 (or the case member 80) having an inverted relationship therebeween with respect to the axis A, positional relationships between the plurality of opening ends 73d to 78d and the plurality of opening ends 83a to 88a become the same as each other. In addition, even if the case member 80 is inverted around the axis A with respect to the base member 70, the first joining projection portions 72A and 72B and the second joining projection portions 81A and 81B overlap each other when viewed in the connection direction D2. Therefore, in both the two foregoing states, the case member 80 can be normally joined to the base member 70. Specifically, even if the case member 80 is vertically inverted (rotated by 180 degrees around the axis A) with respect to the base member 70, the case member 80 can be normally joined to the base member 70. As a result, the case member 80 can be easily joined to the base member 70. In addition, it is possible to prevent occurrence of erroneous assembly as of the case member 80 being joined to the base member 70 in an erroneous direction. On the other hand, the first measurement projection portions 72C and the second measurement projection portions 81C do not overlap each other when viewed in the connection direction D2 even if the case member 80 is inverted around the axis A with respect to the base member 70. That is, even if the case member 80 is joined to the base member 70 in any direction having an inverted relationship therebetween, the first measurement projection portions 72C and the second measurement projection portions 81C do not interfere with each other. Therefore, it is possible to check whether or not hot-plate welding has been performed appropriately, based on the lengths of the first measurement projection portions 72C and the second measurement projection portions 81C.

As illustrated in FIG. 4 and (B) of FIG. 9, tubular portions 89 surrounding respective opening ends 83b to 88b (second opening ends on a side opposite to opening ends 83a to 88a) on the inward side of the second communication holes 83 to 88 and accommodating the valve bodies 90 for closing the respective opening ends 83b to 88b are provided on the inward side of the case member 80. For example, the valve bodies 90 are formed of elastic members such as rubbers having columnar shapes. The valve bodies 90 extend in the connection direction D2 in a state of being accommodated in the tubular portions 89. The tubular portions 89 are formed to have substantially cylindrical shapes in accordance with the shapes of the valve bodies 90. In the present embodiment, a plurality of tubular portions 89 associated with the plurality of respective opening ends 83b to 88b are interlocked with each other (share a part with other tubular portions 89), but they may be separated from each other.

The valve body 90 accommodated in each of the tubular portions 89 is disposed such that each of the opening ends 83b to 88b is closed. Specifically, each of the opening ends 83b to 88b has a bulging shape bulged to the valve body 90 side. Since the valve body 90 is pressed against each of the opening ends 83b to 88b having such a bulging shape, each of the opening ends 83b to 88b is closed.

The inner diameters of the tubular portions 89 are larger than the diameters of the valve bodies 90. In addition, a plurality of projection portions 89a abutting a side surface 90a of the valve body 90 and fixing the valve body 90 to the tubular portion 89 are formed on an inner surface of the tubular portion 89. Each of the projection portions 89a extends in the X direction. In addition, the plurality (here, six) of projection portions 89a are provided at equal intervals (at intervals of 60 degrees around a central axis of the tubular portion 89) when viewed in the X direction. Since the side surface 90a of the valve body 90 is supported by the six projection portions 89a, a clearance G corresponding to the size of the projection portion 89a is provided between the side surface 90a of the valve body 90 and the inner surface of the tubular portion 89 (refer to FIG. 6).

The cover member 100 is a plate-shaped member joined to an end portion 80b of the case member 80 such that openings 80a of the case member 80 is closed. The case member 80 and the cover member 100 are connected to each other such that an accommodation space S accommodating the plurality of valve bodies 90 is formed. The cover member 100 also functions as a pressing member pressing the plurality of valve bodies 90 against the case member 80 in the connection direction D2 such that the plurality of valve bodies 90 are pressed against the respective opening ends 83b to 88b. The cover member 100 is formed of polypropylene (RP), polyphenylene sulfide (PPS), or modified polyphenylene ether (modified PPE), for example. A method of joining the cover member 100 to the end portion 80b of the case member 80 is not particularly limited. For example, laser welding, hot-plate welding, or fastening using fastening members such as bolts can be used. For example, when laser welding is used, the cover member 100 is formed of a laser transmissive resin, the case member 80 is formed of a laser absorbent resin, and irradiation of a laser is performed from the cover member 100 side, so that a boundary part between the case member 80 and the cover member 100 is melted and they can be joined to each, other.

The compression ratio of the valve bodies 90 in a state of being pressed against the case member 80 by the cover member 100 is regulated in advance such that the opening ends 83b to 88b blocked by the valve bodies 90 are released when the pressures inside the second communication holes 83 to 88 (that is, the pressures inside the internal spaces V respectively communicating with the second communication holes 83 to 88) becomes equal to or higher than a set value set in advance, for example.

Subsequently, a mechanism for performing pressure regulation of the internal spaces V will be described. Here, focusing on an opening end 84b illustrated in FIG. 6, a mechanism for performing pressure regulation of the associated internal space V12 will be described. The second communication hole 84 communicates with the associated internal space V12 through the first communication hole 74 and the first opening 52a12. Therefore, a pressure equivalent to that in the internal space V12 is applied to a part closing the opening end 83b of the valve body 90. As described above, the compression ratio of the valve body 90 is restricted such that the opening end 84b blocked by the valve body 90 is released when the pressure inside the associated internal space V12 becomes equal to or higher than the set value set in advance. Therefore, when the pressure inside the associated internal space V12 is lower than the set value, a closed valve state in which the opening end 84b is closed by the valve body 90 is maintained, as illustrated in FIG. 6.

On the other hand, when the pressure inside the internal space V12 rises and becomes equal to or higher than the set value, a part (specifically, a part closing the opening end 84b and a surrounding part thereof) of the valve body 90 is deformed such that it is separated from the opening end 84b, thereby being in an open valve state in which the blocked opening end 84b is released. As a result, gas inside the internal space V12 is emitted from the released opening end 84b that has been blocked. Thereafter, when the pressure inside the internal space V12 becomes lower than the set value, the valve body 90 returns to the original state, so that the opening end 84b is in a closed valve state (the state illustrated in FIG. 6) again. Due to the opening/closing operation described above, the pressure regulating valve 60 can appropriately regulate the pressure inside the internal space V12. Mechanisms for performing pressure regulation of the internal spaces V associated with other opening ends 83b and 85b to 88b are similar to the mechanism described above.

As described above, the valve body 90 is fixed to the tubular portion 89 such that the clearance G is provided between the inner surface of the tubular portion 89 and the valve body 90. Accordingly, when the valve body 90 closing the opening end 84b of the second communication hole 84 is separated from the opening end 84b in accordance with a pressure rise inside the internal space V (here, as an example, the internal space V12), gas inside the internal space V12 can escape appropriately through the clearance G between the valve body 90 and the tubular portion 89.

In addition, an end surface 89b of the tubular portion 89 on the cover member 100 side is separated from the cover member 100. Accordingly, gas which has escaped through the clearance G between the valve body 90 and the tubular portion 89 in an open valve state described above can further escape appropriately through the accommodation space S between the end surface 89b of the tubular portion 89 and the cover member 100.

In addition, exhaust ports 100a (two exhaust ports 100a in the example in FIG. 4) allowing the accommodation space S and an external space to communicate with each other are provided at positions not overlapping the plurality of valve bodies 90 when viewed in the connection direction D2 in the cover member 100. Accordingly, gas which has been emitted from the internal spaces V through the first communication holes 73 to 78 and the second communication holes 83 to 88 can be discharged appropriately to the external space through the exhaust ports 100a without accumulating in the accommodation space S. Particularly, since the exhaust ports 100a are provided in the cover member 100, gas inside the accommodation space S (gas at a relatively high temperature) can be discharged in a direction away from a main body of the power storage module 12 as far as possible (in a direction along the connection direction D2). Accordingly, it is possible to effectively curb an adverse influence of gas discharged from the pressure regulating valves 60 on the power storage module 12.

As described above, the power storage module 12 of the present embodiment includes the laminate 30 constituted of the laminated bipolar electrodes 32 including the electrode plate 34, the positive electrode 36 provided on one surface of the electrode plate 34, and the negative electrode 38 provided on the other surface of the electrode plate 34; the frame body 50 holding the edge portion 34a of the electrode plate 34 and provided with the openings 50a communicating with the plurality of internal spaces V between the bipolar electrodes 32 adjacent to each other in the laminate 30; and the pressure regulating valves 60 connected to the openings 50a. The pressure regulating valve 60 has the base member 70 provided with the plurality of first communication holes 73 to 78 communicating with the plurality of internal spaces V through the openings 50a and connected to the openings 50a, the case member 80 provided with the plurality of second communication holes 83 to 88 communicating with the plurality of first communication holes 73 to 78 and joined to the side surface 72 of the base member 70, the plurality of valve bodies 90 closing the opening ends 83b to 88b of the plurality of second communication holes 83 to 88; and the cover member 100 pressing the plurality of valve bodies 90 against the case member 80 in the connection direction D2 such that the plurality of valve bodies 90 are pressed against the plurality of opening ends 83b to 88b.

In this power storage module 12, the pressure regulating valves 60 having the plurality of valve bodies 90 closing the opening ends 83b to 88b on an outlet side of the plurality of communication holes (the first communication holes 73 to 78 and the second communication holes 83 to 88) communicating with the plurality (in the present embodiment, six) of respective internal spaces V are provided. That is, in order to perform pressure regulation of the plurality of internal spaces V in the laminate 30 having the bipolar electrodes 32, one pressure regulating valve 60 common to the plurality of internal spaces V is provided. Accordingly, the constitution for performing pressure regulation of the plurality of internal spaces V between the bipolar electrodes 32 can be simplified.

In addition, the power storage module 12 includes the plurality (in the present embodiment, four) of pressure regulating valves 60. The frame body 50 is provided with the plurality (four) of openings 50a (50a1 to 50a4) to which the plurality of pressure regulating valves 60 are connected. The plurality of openings 50a communicate with the internal spaces V differing from each other for each of the openings 50a. In this manner, since the plurality of openings 50a are provided in the frame body 50, it is possible to reduce the number of internal spaces V (in other words, the number of internal spaces V as targets for performing pressure regulation by one pressure regulating valve 60, that is, the number of communication holes required to be provided for one pressure regulating valve 60) communicating with one opening 50a, compared to a ease where only one opening 50a is provided. Accordingly, the cross-sectional area of one first communication hole and the cross-sectional area of one second communication hole of the pressure regulating valve 60 can be increased, and air can circulate smoothly inside these communication holes.

In addition, the base member 70 and the case member 80 are connected to each other with the partitioning wall W extending in the connection direction D2 therebetween such that each of the plurality of communication paths formed by the plurality of first communication holes 73 to 78 and the plurality of second communication holes 83 to 88 is partitioned. If the side surface 71 of the base member 70 and the side surface 81 of the case member 80 are subjected to surface-joining through welding, there is a risk that joint parts of the first communication holes 73 to 78 and second communication holes 83 to 88 may be blocked due to the base member 70 or the case member 80 which has melted. On the other hand, according to a constitution in which the base member 70 and the case member 80 are joined to each other with the partitioning wall W therebetween as described above (for example, a constitution welded through hot-plate welding), it is possible to reduce a risk that a joint part may be blocked due to the base member 70 and the case member 80 joined to each other.

In addition, on the side surface 72, the first joining projection portions 72A and 72B extending in the connection direction. D2 such that each of the plurality of first communication holes 73 to 78 is partitioned when viewed in the connection direction 132, and the first measurement projection portions 72C extending in the connection direction D2 are provided. On the side surface 81, the second joining projection portions 81A and 81B extending in the connection direction D2 such that each of the plurality of second communication holes 83 to 88 is partitioned in association with the first joining projection portions 72A and 72B when viewed in the connection direction D2, and the second measurement projection portions 81C extending in the connection direction D2 such that they do not overlap the first measurement projection portions 72C when viewed in the connection direction D2 are provided. The first joining projection portions 72A and 72B and the second joining projection portions 81A and 81B are joined to each other through hot-plate welding. The end portions of the first measurement projection portions 72C and the end portions of the second measurement projection portions 81C are in a solid state after melting through the hot-plate welding.

In this constitution, the first measurement projection portions 72C and the second measurement projection portions 81C are provided such that they do not overlap each other when viewed in the connection direction D2. Therefore, lengths c of the first measurement projection portions 72C in the connection direction 132 are equivalent to the lengths of the first joining projection portions 72A and 72B in the connection direction D2 after being brought into contact with a hot plate and end portions thereof have melted (lengths before the first joining projection portions 72A and 72B and the second joining projection portions 81A and 81B are brought into contact with each other and fitted together), Similarly, lengths d of the second measurement projection portions 81C in the connection direction D2 are equivalent to the lengths of the second joining projection portions 81A and 81B in the connection direction D2 after being brought into contact with a hot plate and end portions thereof have melted (lengths before the first joining projection portions 72A and 72B and the second joining projection portions 81A and 81B are brought into contact with each other and fitted together). Therefore, according to this power storage module 12, based on lengths a of the first joining projection portions 72A and 72B in the connection direction before hot-plate welding, lengths b of the second joining projection portions 81A and 81B in the connection direction before hot-plate welding, the lengths c of the first measurement projection portions 72C, the lengths d of the second measurement projection portions 81C, and a gap e between the side surface 72 and the side surface 81 in the connection direction D2, it is possible to calculate a melting amount ($=a-c$) of the first joining projection portions 72A and 72B, a melting amount ($=b-d$) of the second joining projection portions 81A and 81B, and a fitting amount ($=c+d-e$) between the base member 70 and the case member 80. Accordingly, in a constitution including the pressure regulating valves 60 having the base member 70 and the case member 80 joined to each other through hot-plate welding, based on the melting amounts and the fitting amount of each of the portions (the first joining projection portions 72A and 72B and the second joining projection portions 81A and 81B) calculated as described above, it is possible to easily check whether or not hot-plate welding has been performed appropriately.

In addition, the plurality of first measurement projection portions 72C are provided on the side surface 72. Particularly in the present embodiment, four first measurement projection portions 72C are provided at four corners on the side surface 72. In this case, based on the presence or absence, the degree, and the like of variation in length of the plurality of first measurement projection portions 72C in the connection direction D2, it is possible to check a parallelism between the hot plate and the side surface 72 when the first joining projection portions 72A and 72B and the first measurement projection portions 72C are brought into contact with a hot plate. That is, it is possible to check whether or not a hot plate is pressed against the first joining projection portions 72A and 72B and the first measurement projection portions 72C in an appropriate posture (a posture parallel to the side surface 72).

In addition, a plurality of second measurement projection portions 81C are provided on the side surface 81. Particularly in the present embodiment, four second measurement projection portions 81C are provided at four corners on the side surface 81. In this case, based on the presence or absence, the degree, and the like of variation in length of the plurality of second measurement projection portions 81C in the connection direction D2, it is possible to check a parallelism between the hot plate and the side surface 81 when the second joining projection portions 81A and 81B and the second measurement projection portions 81C are brought into contact with a hot plate. That is, it is possible to check whether or not a hot plate is pressed against the second joining projection portions 81A and 81B and the second measurement projection portions 81C in an appropriate posture (a posture parallel to the side surface 81).

In addition, the plurality of opening ends 83b to 88b are disposed in a manner of being shifted from each other in a direction intersecting the lamination direction D1 when viewed in the connection direction D2. In the present embodiment, for example, it is conceivable that the power storage device 10 is disposed such that the lamination direction D1 becomes an up-down direction (a vertical direction). In this case, when the pressure regulating valves are opened, an electrolytic solution may be discharged from the opening ends 83b, to 88b together with gas inside thereof. At this time, if the plurality of opening ends are disposed on the same straight line in the lamination direction D1, there is a possibility that electrolytic solutions discharged at the same time from the opening ends disposed on the upper side and the opening ends disposed on the lower side may merge together and may cause a liquid junction. In the present embodiment, the plurality of opening ends 83b to 88b are disposed in a manner of being shifted from each other in the Y direction. That is, the plurality of opening ends 83b to 88b are not disposed on the same straight line in the lamination direction D1. Accordingly, a liquid junction between the opening ends 83b to 88b is curbed. In the present embodiment, the plurality of tubular portions 89 respectively surrounding the opening ends 83b to 88b and extending in the connection direction D2 are also disposed in a manner of being shifted from each other in the Y direction. In this case, for example, an electrolytic solution discharged from the opening ends 83b to 88b may drip into the case member 80 from the end portions of the tubular portions 89. Therefore, a liquid junction between the opening ends 83b to 88b is better curbed.

[Method of Manufacturing Power Storage Device]

Hereinafter, an example of a method of manufacturing the power storage device 10 (including a method of manufacturing the power storage module 12) illustrated in FIG. 1 will be described.

(Laminating Step)

First, for example, the laminate 30 is obtained by laminating the bipolar electrodes 32 with the separators 40 therebetween. In the present embodiment, before a laminating step, the first resin portions 52 are formed in the edge portions 34a of the electrode plates 34 of the respective bipolar electrodes 32 through injection molding, for example. In the laminating step, a constitution excluding the second resin portion 54 from the constitution illustrated in FIG. 2 can be obtained.

(Step of Forming Frame Body)

Next, the second resin portion 54 is formed through injection molding, for example. As a result, as illustrated in FIGS. 2 and 3, the frame body 50 having the first resin portion 52 and the second resin portion 54 is formed. In the present embodiment, the first resin portion 52 which is a part of the frame body 50 is formed before the laminating step, and the second resin portion 54 which is the remaining part of the frame body 50 is formed after the laminating step. However, the first resin portion 52 which is a part of the frame body 50 may be formed after the laminating step.

(Step of Connecting Base Member)

Next, the base member 70 is connected to the openings 50a. As described above, the base member 70 is fixed to the openings 50a through welding of a part or all of the contact part between the side surface 71 of the base member 70 and the first resin portion 52, for example. Welding of the side surface 71 and the first resin portion 52 is performed through hot-plate welding, laser transmission welding, or ultrasonic welding, for example. Accordingly, the base member 70 is fixed to the openings 50a.

(Step of Injecting Electrolytic Solution)

Next, an electrolytic solution is injected into each of the plurality of internal spaces V (in the present embodiment, six internal spaces V communicating with the openings 50a to which the base member 70 is connected) through the plurality of first communication holes 73 to 78 provided in the base member 70. A solution amount for each of the internal spaces V can be managed by injecting the solution while managing the solution amount for each of the first communication holes 73 to 78. In addition, in order to inspect that each of the internal spaces V inside the power storage module 12 is reliably sealed before the electrolytic solution is injected, vacuuming (deflation work) may be performed for each of the internal spaces V through the plurality of first communication holes 73 to 78. Accordingly, airtightness of each of the internal spaces V can be inspected before the electrolytic solution is injected. Injection of an electrolytic solution through the base member 70 may be performed using a dedicated jig or the like.

(Preparing Step)

Next, a pressure regulating valve sub-module SM (refer to FIG. 8) which is a unit constituted of the case member 80, a plurality of valve bodies 90, and the cover member 100 is prepared. The pressure regulating valve sub-module SM is formed by assembling the cover member 100 in the case member 80 after the valve bodies 90 are accommodated in the respective tubular portions 89 provided on the inward side of the case member 80.

(Inspecting Step)

Next, the pressure regulating valve sub-module SM prepared in the preparing step is inspected. Accordingly, it is possible to check in advance whether or not the functions as the pressure regulating valves 60 are normally exhibited. Specifically, an operation of the pressure regulating valve sub-module SM is inspected by sending air into each of the second communication holes 83 to 88 from the opening ends 83a to 88a of the respective second communication holes 83 to 88 provided in the case member 80. More specifically, it is inspected whether or not valve opening pressures of the plurality of valve bodies 90 included in the pressure regulating valve sub-module SM are normal. An operation of sending air into each of the second communication holes 83 to 88 from the respective opening ends 83a to 88a may be performed using a dedicated jig, for example. In an inspecting step, pressure values at the time of releasing the opening ends 83b to 88b blocked by the valve bodies 90 are checked for the respective second communication holes 83 to 88. Further, the pressure values and the pressure values set in advance are compared to each other. For example, if an error between the pressure value and the pressure value set in advance is equal to or smaller than an allowable error, the valve opening pressure of the valve body 90 is determined to be normal. On the other hand, when the error is larger than, the allowable error, the valve opening pressure of the valve body 90 is determined to be abnormal. When the valve opening pressures of the valve bodies 90 are determined to be normal with respect to all the second communication holes 83 to 88 through the inspection, the inspected pressure regulating valve sub-module SM is determined to be normal. On the other hand, when the valve opening pressure of the valve body 90 is determined to be abnormal with respect to at least one of the second communication holes 83 to 88, the inspected pressure regulating valve sub module SM is determined to be abnormal.

(Joining Step)

Next, the base member 70 and the case member 80 of the inspected pressure regulating valve sub-module SM which has been determined to be normal in the inspecting step are joined to each other such that the plurality of first communication holes 73 to 78 and the plurality of second communication holes 83 to 88 communicate with each other. As described above, the joining is performed through hot-plate welding of the first joining projection portions 72A and 72B provided on the side surface 72 of the base member 70 and the second joining projection portions 81E and 81B provided on the side surface 81 of the case member 80.

A joining step will be described with reference to FIG. 10. FIG. is a view schematically illustrating a procedure in the joining step. First, a hot plate HP is prepared ((A) of FIG. 10). Subsequently, the hot plate HP is brought into contact with the end portion of each of the first joining projection portions 72A and 72B, the second joining projection portions 81A and 81B, the first measurement projection portions 72C, and the second measurement projection portions 81C ((B) of FIG. 10). Accordingly, the end portion of each of the first joining projection portions 72A and 72B, the second joining projection portions 81A and 81B, the first measurement projection portions 72C, and the second measurement projection portions 81C is in a melted state. In addition, the length of each of the projection portions in the connection direction D2 is shortened by the melted part of the end portion of each of the projection portions. In a state before the hot plate HP is brought into contact therewith, the lengths of the first measurement projection portions 72C in the connection direction D2 are equivalent to the lengths a of the first joining projection portions 72A and 72B in the connection direction 1D2. Similarly, in a state before the hot plate HP is brought into contact therewith, the lengths of the second measurement projection portions 81C in the connection direction D2 are equivalent to the lengths b of the second joining projection portions 81A and 81B in the connection direction D2.

Subsequently, the first joining projection portions 72A and 72B and the second joining projection portions 81A and 81B are joined to each other by bringing the melted end portions of the first joining projection portions 72A and 72B and the melted end portions of the second joining projection portions 81A and 81B into contact with each other. In this manner, the partitioning wall W connecting the side surface 72 and the side surface 81 to each other is formed through hot-plate welding of the first joining projection portions 72A and 72B and the second joining projection portions 81A and 81B ((C) of FIG. 10).

Thereafter, as illustrated in FIG. 1, the plurality of power storage modules 12 are laminated with the conductive plates 14 therebetween. The positive electrode terminal 24 and the negative electrode terminal 26 are respectively connected in advance to the conductive plates 14 positioned at both ends in the lamination direction D1. Thereafter, the pair of restraint plates 16A and 16B are respectively disposed at both ends in the lamination direction D1 with the insulation films 22 therebetween. Thereafter, the shaft portions of the bolts 18 are inserted into the insertion holes H1 of the restraint plate 16A and are inserted into the insertion holes H2 of the restraint plate 16B. Thereafter, the nuts 20 are screwed to the tips of the bolts 18 protruding from the restraint plate 16B. In this manner, the power storage device 10 illustrated in FIG. 1 is manufactured.

As described above, the method for manufacturing a power storage module of the present embodiment includes the laminating step, the step of forming a frame body, the step of connecting a base member, the preparing step, and the joining step. In this manufacturing method, since the pressure regulating valve sub-module SM is joined to a member in which the base member 70 is connected to the laminate 30 and the frame bodies 50, one pressure regulating valve 60 common to the plurality of internal spaces V in the laminate 30 can be easily mounted. Therefore, according to the manufacturing method, the constitution for performing pressure regulation of the plurality of internal spaces V between the bipolar electrodes 32 is simplified, and then a step of manufacturing the power storage module 12 having this constitution can be simplified.

In addition, the manufacturing method further includes a step of injecting an electrolytic solution into the plurality of internal spaces V through the plurality of first communication holes 73 to 78, after the connecting step and before the joining step. In the step of injecting an electrolytic solution, an electrolytic solution can be injected easily into each, of the internal spaces V in the laminate 30 utilizing the plurality of first communication holes 73 to 78 provided in the base member 70.

In addition, the manufacturing method further includes an inspecting step of inspecting an operation of the pressure regulating valve sub-module SM by sending air into the second communication holes 83 to 88 from the opening ends 83a to 88a of the second communication holes 83 to 88, after the preparing step and before the joining step. Further, in the joining step, the base member 70 and the case member 80 of the inspected pressure regulating valve sub-module SM an joined to each other. In this case, before the pressure regulating valve sub-module SM is joined to the base member 70, an operation of the pressure regulating valve sub-module SM (for example, the valve opening pressure of each of the valve bodies 90) can be inspected utilizing the plurality of second communication holes 83 to 88 provided in the pressure regulating valve sub-module SM. As a result, it is possible to improve the yield of the power storage module 12 which will be manufactured eventually.

In addition, in the manufacturing method, in the joining step, the base member 70 and the case member 80 are joined to each other through hot-plate welding of the end portions of the first joining projection portions 72A and 72B and the end portions of the second joining projection portions 81A and 81B. Due to hot-plate welding between such projection portions, when the base member 70 and the case member 80 are joined to each other, it is possible to reduce a risk that joint parts of the first communication holes 73 to 78 and the second communication holes 83 to 88 may be blocked.

Figure 10:
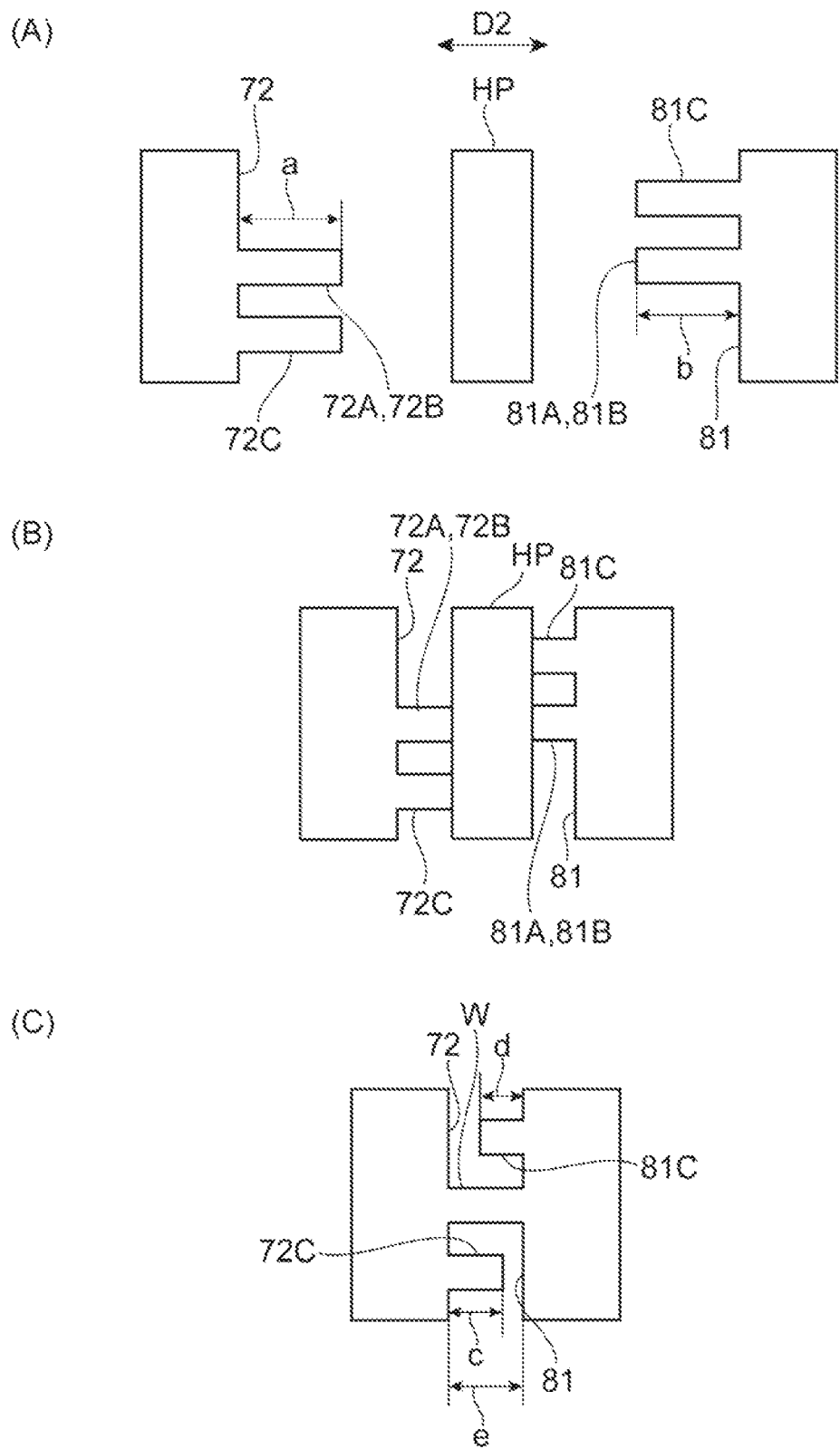
FIG. 10 is a view schematically illustrating a procedure in a joining step.

In addition, the joining step includes a step of bringing a hot plate into contact with the end portion of each of the first joining projection portions 72A and 72B, the second joining projection portions 81A and 81B, the first measurement projection portions 72C, and the second measurement projection portions 81C (refer to (13) of FIG. 10); and a step of joining the first joining projection portions 72A and 72B and the second joining projection portions 81A and 81B to each other by bringing the melted end portions of the first joining projection portions 72A and 72B and the melted end portions of the second joining projection portions 81A and 81B into contact with each other (refer to (C) of FIG. 10). In this manufacturing method, the base member 70 and the case member 80 having the first measurement projection portions 72C and the second measurement projection portions 81C provided such that they do not overlap each other when viewed in the connection direction D2 are joined to each other through hot-plate welding. Accordingly, the lengths c of the first measurement projection portions 72C in the connection direction D2 after hot-plate welding become equivalent to the lengths of the first joining projection portions 72A and 72B in the connection direction D2 (lengths before the first joining projection portions 72A and 72B and the second joining projection portions 81A and 81B are brought into contact with each other and fitted together) after being brought into contact with a hot plate and end portions thereof have melted. In addition, the lengths d of the second measurement projection portions 81C in the connection direction D2 after hot-plate welding become equivalent to the lengths of the second joining projection portions 81A and 81B in the connection direction D2 (lengths before the first joining projection portions 72A and 72B and the second joining projection portions 81A and 81B are brought into contact with each other and fitted together) after being brought into contact with a hot plate and end portions thereof have melted. Therefore, according to this method of manufacturing the power storage module 12, based on the lengths a of the first joining projection portions 72A and 72B in the connection direction D2 before hot-plate welding, the lengths b of the second joining projection portions 81A and 81B in the connection direction D2 before hot-plate welding, the lengths c of the first measurement projection portions 72C, the lengths d of the second measurement projection portions 81C, and the gap e between the side surface 72 and the side surface 81 in the connection direction D2, it is possible to obtain the power storage module 12 in which the melting amount (=a−c) of the first joining projection portions 72A and 72B, the melting amount (=b−d) of the second joining projection portions 81A and 81B, and the fitting amount (=c+d−e) between the base member 70 and the case member 80 can be calculated. Accordingly, in a constitution including the pressure regulating valves 60 having the base member 70 and the case member 80 joined to each other through hot-plate welding, based on the melting amounts and the fitting amount of each of the portions (the first joining projection portions 72A and 72B and the second joining projection portions 81A and 81B) calculated as described above, it is possible to easily check whether or not hot-plate welding has been performed appropriately.

Hereinabove, a favorable embodiment of the present disclosure has been described in detail. However, the present disclosure is not limited to the foregoing embodiment. For example, in the pressure regulating valves 60, the first measurement projection portions 72C and the second measurement projection portions 81C may be omitted. In addition, in the constitution of the present embodiment, one valve body 90 closes one opening end (any of the opening ends 83b to 88b). However, for example, a constitution in which one valve body closes a plurality of opening ends using a plate-shaped valve body (that is, a constitution in which one valve body is used in common with respect to a plurality of opening ends) may be employed.

In addition, as a member fix closing the openings 80a of the case member 80, the plate-shaped cover member 100 in which the exhaust ports 100a are formed has been described as an example, but the embodiment is not limited thereto. Hereinafter, another example of a member for closing the openings 80a of the case member 80 will be described. Hereinafter, points differing from those of the foregoing embodiment will be described mainly. The same reference signs are applied to elements or members which are the same or equivalent, and detailed description will be omitted.

Figure 11:
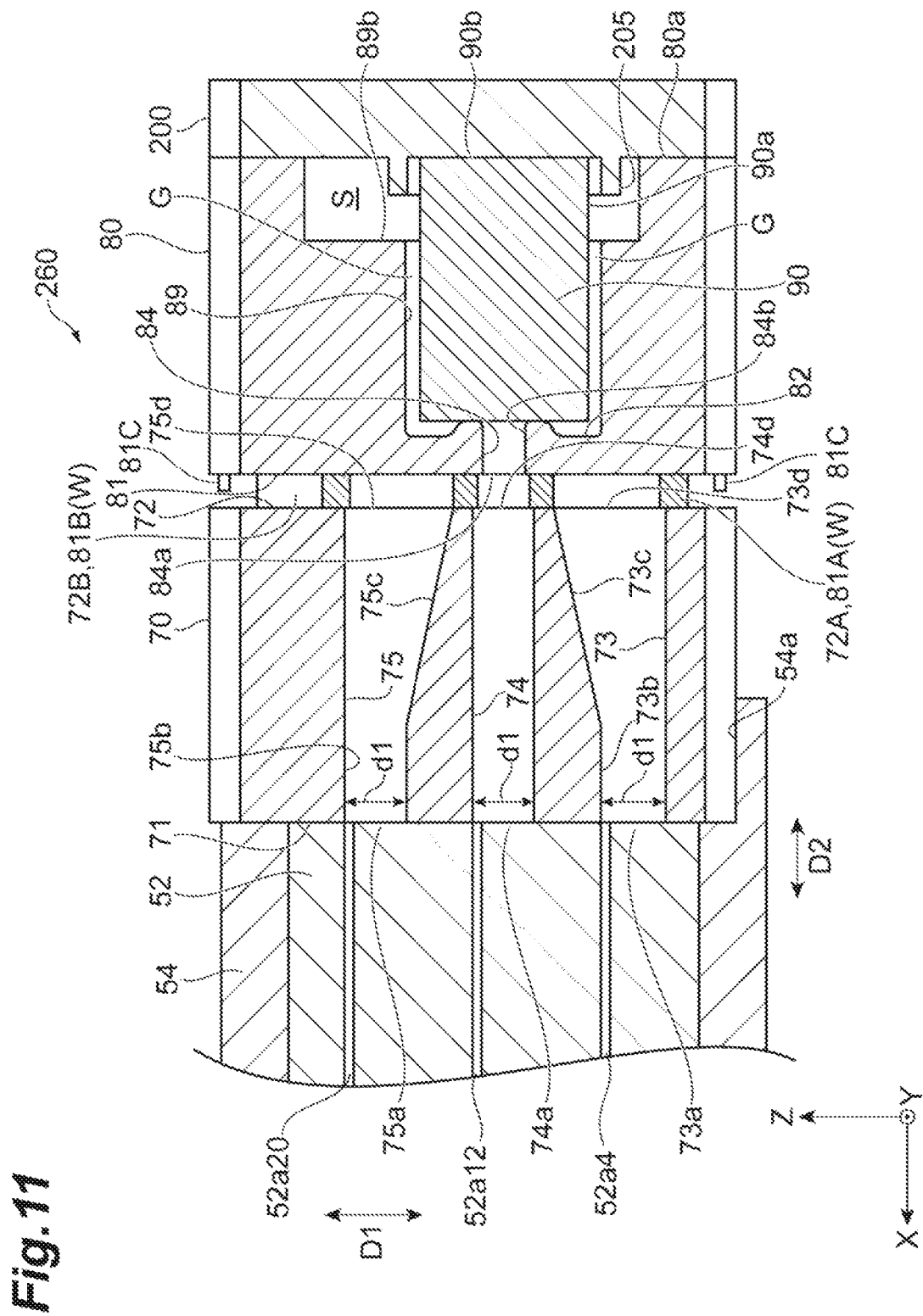
FIG. 11 is a schematic cross-sectional view illustrating a constitution of a pressure regulating valve according to another em hod intent.

FIG. 11 is a schematic cross-sectional view illustrating a constitution of a pressure regulating valve according to another form. FIG. 11 is a cross-sectional view including a cross section of communication paths (communication paths formed by the first opening 52a12, the first communication hole 74, and the second communication hole 84) associated with the internal space V12. As illustrated in FIG. 11, a pressure regulating valve 260 has the base member 70, the case member 80, the plurality of valve bodies 90, and a cover member 200 (a third member).

Similar to the cover member 100, the cover member 200 is a member joined to the case member 80. The case member 80 and the cover member 200 are connected to each other such that the accommodation spaces S accommodating the plurality of valve bodies 90 is formed. The cover member 200 also functions as a pressing member pressing the plurality of valve bodies 90 against the case member 80 in the connection direction D2 such that the plurality of valve bodies 90 are pressed against the respective opening ends 83b to 88b.

Figure 12:
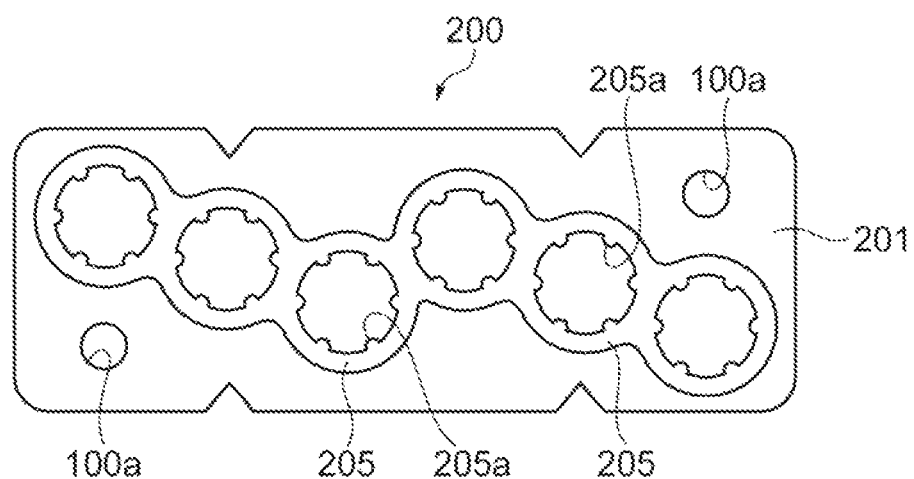
FIG. 12 is a view illustrating a side surface on a case member side in a cover member constituting the pressure regulating valve in FIG. 11.

FIG. 12 is a view illustrating a side surface on a case member side in a cover member. The cover member 200 has a main body portion 201 having a plate shape. The exhaust ports 100a penetrating the main body portion 201 are provided at positions not overlapping the plurality of valve bodies 90 when viewed in the X direction in the main body portion 201. In addition, a plurality of support portions 205 respectively supporting the plurality of valve bodies 90 are provided on the side surface of the case member 80 side in the main body portion 201. The plurality of support portions 205 are formed at positions respectively facing the plurality of tubular portions 89. The valve bodies 90 are supported by the tubular portions 89 and the support portions 205. The support portions 205 are formed to have tubular shapes (in the illustrated example, substantially cylindrical shapes) in accordance with the shapes of the valve bodies 90. In the present embodiment, the plurality of support portions 205 are interlocked with each other (share a part with other support portions adjacent thereto in the Y direction), but they may be separated from each other.

The inner diameters of the support portions 205 are larger than the diameters of the valve bodies 90. In addition, a plurality of projection portions 205a abutting the side surface 90a of the valve body 90 and fixing the valve body 90 to the support portion 205 are formed on the inner surface of the support portion 205. Each of the projection portions 205a extends in the X direction. In addition, the plurality (here, six) of projection portions 205a are provided at equal intervals (at intervals of 60 degrees around a central axis of the support portion 205) when viewed in the X direction. Since the side surface 90a of the valve body 90 is supported by the six projection portions 205a, a clearance corresponding to the size of the projection portion 205a can be provided between the side surface 90a of the valve body 90 and the inner surface of the support portion 205.

For example, when the pressure regulating valve is manufactured, if the valve bodies are assembled in a state of inclining with respect to the X direction, there is a possibility that the valves are opened by a pressure different from the set valve opening pressure. In a modification example illustrated in FIGS. 11 and 12, since the support portions 205 supporting the valve bodies 90 are formed in the cover member 200, pressing of the valve bodies 90 against the cover member 200 in a state of inclining with respect to the X direction is curbed. Accordingly, opening of the valves by a pressure different from the set valve opening pressure is curbed. In addition, in this constitution, since the support portions 205 support the side surfaces 90a of the valve bodies 90 throughout the entire circumference, inclination of the valve bodies 90 can be curbed more reliably.

Figure 13:
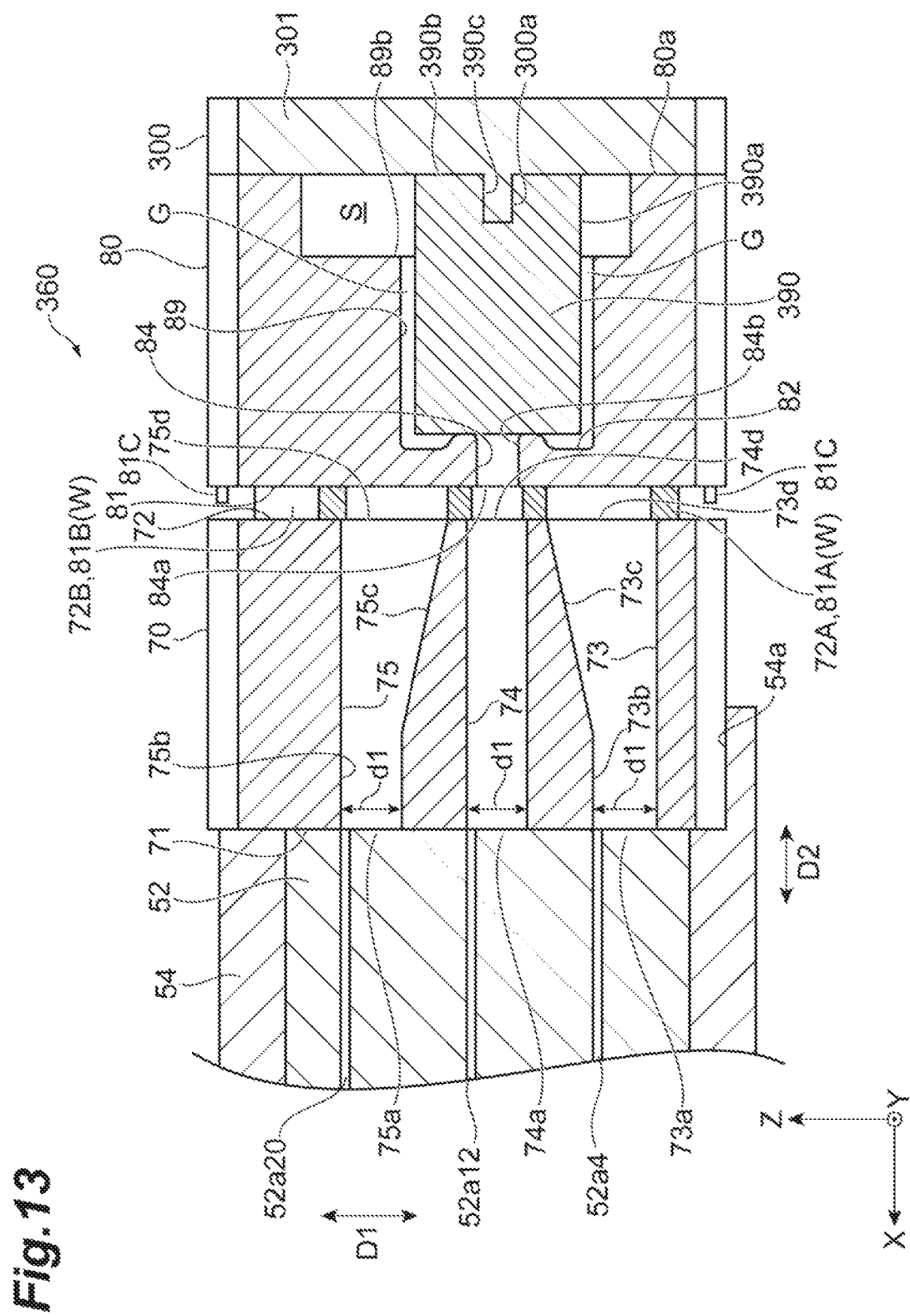
FIG. 13 is a schematic cross-sectional view illustrating a constitution of a pressure regulating valve according to still another embodiment.

FIG. 13 is a schematic cross-sectional view illustrating a constitution of a pressure regulating valve according to still another form. FIG. 13 is a cross-sectional view including a cross section of communication paths (communication paths formed by the first opening 52a12, the first communication hole 74, and the second communication hole 84) associated with the internal space V12. As illustrated in FIG. 13, a pressure regulating valve 360 has the base member 70, the case member 80, a plurality of valve bodies 390 (elastic members), and a cover member 300 (a third member).

For example, the valve bodies 390 are formed of elastic members such as rubbers having substantially columnar shapes. The valve bodies 390 extend in the connection direction D2 in a state of being accommodated m the tubular portion 89. The valve bodies 390 accommodated in the respective tubular portions 89 are disposed such that each of the opening ends 83b to 88b is closed. A hole 390c recessed to the opening end 84b side of the case member 80 is formed on a surface 390b of the valve body 390 on the cover member 300 side. The hole 390c has a columnar shape extending in the X direction. The hole 390c is formed at the center on the surface 390b.

The diameters of the valve bodies 390 are smaller than the inner diameters of the tubular portions 89. In a state where the valve bodies 390 are accommodated in the tubular portions 89, a side surface 390a of the valve body 390 abuts the projection portions 89a of the tubular portion 89. Since the side surface 390a of the valve body 390 is supported by the six projection portions 89a, the clearance G corresponding to the size of the projection portion 89a is provided between the side surface 390a of the valve body 390 and the inner surface of the tubular portion 89.

Similar to the cover member 100, the cover member 300 is a member joined to the case member 80. The case member 80 and the cover member 300 are connected to each other such that the accommodation spaces S accommodating the plurality of valve bodies 390 is formed. The cover member 300 also functions as a pressing member pressing the plurality of valve bodies 390 against the case member 80 in the connection direction D2 such that the plurality of valve bodies 390 are pressed against the respective opening ends 83b to 88b. The cover member 300 has a main body portion 301 having a plate shape. Exhaust ports (not illustrated in FIG. 13) penetrating the main body portion 301 are provided at positions not overlapping the plurality of valve bodies 390 when viewed in the connection direction D2 in the main body portion 301. In addition, a plurality of support portions 300a supporting the plurality of valve bodies 390 are provided on a side surface of the main body portion 301 on the case member 80 side. The plurality of support portions 300a have projecting shapes to be fitted into the hole 390c and are formed at positions respectively facing the plurality of tubular portions 89. For example, the support portion 300a has a columnar shape extending in the X direction and has substantially the same outer diameter as the inner diameter of the hole 390c. In the present embodiment, the support portion 300a is formed at a position facing the hole 390c in the valve body 390 supported by the tubular portion 89.

In the modification example illustrated in FIG. 13, since the support portions 300a formed in the cover member 300 are fitted into the holes 390c formed in the valve bodies 390, the cover member 300 can support the valve bodies 390. Accordingly, pressing of the valve bodies 390 against the cover member 300 in a state of inclining with respect to the X direction is curbed. In addition, in this constitution, compared to a supporting form surrounding the side surface 90a of the valve body 90, it is possible to reduce a load on the support portion 300a received from the valve body 90 when the valve body 90 is compressed.

In the foregoing embodiment, an example in which the base member 70 of the pressure regulating valve 60 is joined to the openings 50a serving as connection portions formed in the frame body 50 has been described, but the embodiment is not limited thereto. For example, the base member (the first member) may be integrally formed with the frame body. That is, the base member may be constituted of a part of the frame body. Hereinafter, an example in which the base member is integrally formed with the frame body will be described. Points differing from those of the foregoing embodiment will be described mainly. The same reference signs are applied to elements or members which are the same or equivalent, and detailed description will be omitted.

Figure 14:
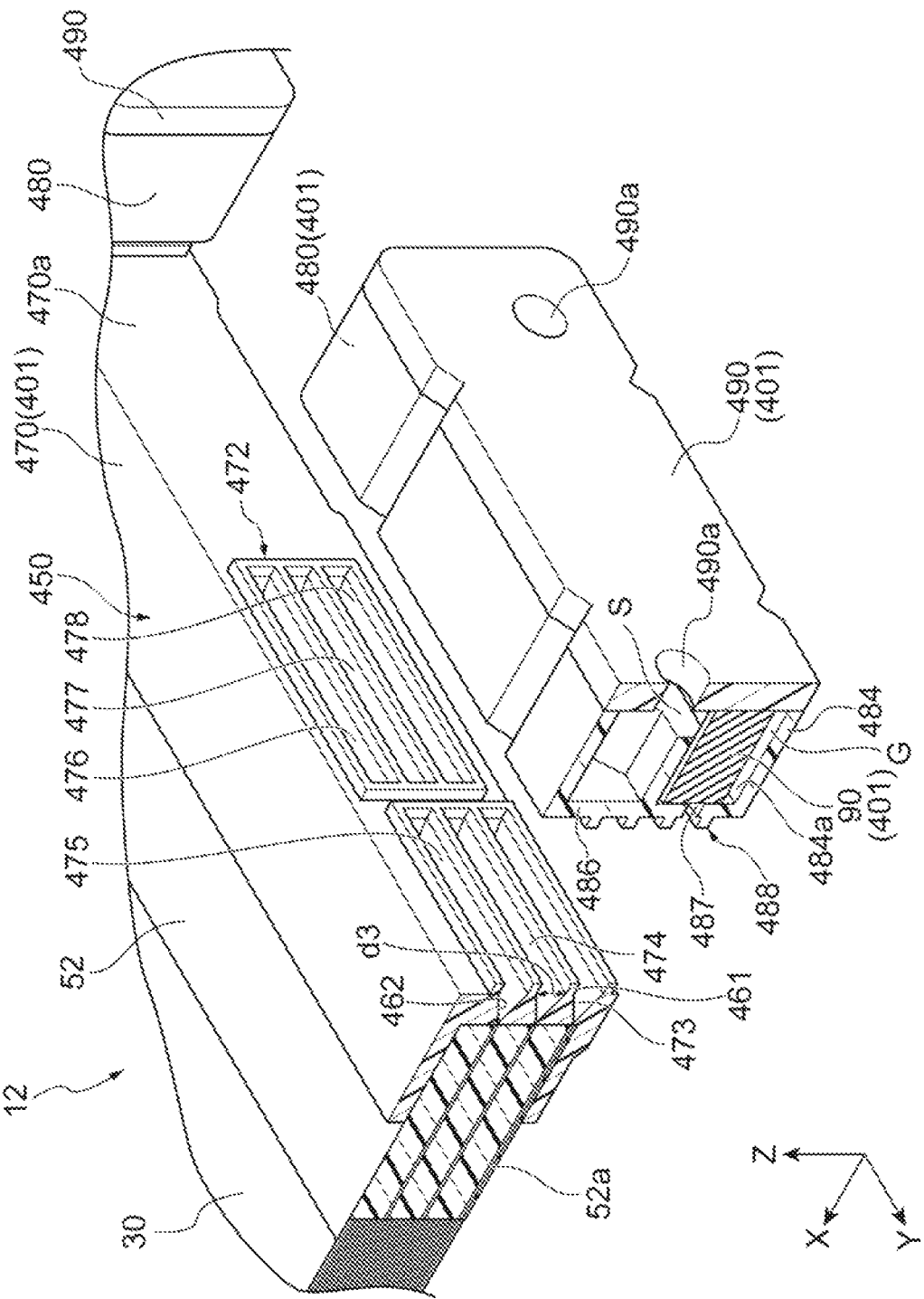
FIG. 14 is a perspective view illustrating a constitution of the pressure regulating valve according to still another embodiment.

FIG. 14 illustrates an example in which a base member constituting a pressure regulating valve is integrally formed with a frame body. FIG. 14 is a perspective view of a power storage module and a pressure regulating valve partially showing cross sections thereof. In the power storage module 12 illustrated in FIG. 14, a frame body 450 is constituted of the first resin portion 52 and a second resin portion 470. In the present modification example, a pressure regulating valve 401 is constituted of the second resin portion 470 constituting the frame body 450, a case member 480, the valve body 90, and a cover member 490. The frame body 450 is a member corresponding to the frame body 50 in the foregoing embodiment. The second resin portion 470 has both the function of the second resin portion 54 and the function of the base member 70 in the foregoing embodiment. The case member 480 is a member corresponding to the case member 80 in the foregoing embodiment. The cover member 490 is a member corresponding to the cover member 100 in the foregoing embodiment.

As described above, the first openings 52a communicating with the internal spaces V between the bipolar electrodes 32 adjacent to each other are provided in the first resin portion 52. First communication holes 473 to 478 are provided in the second resin portion 470. The first communication holes 473 to 478 penetrate the second resin portion 470 in the X direction. The first communication holes 473 to 478 are respectively connected to the associated first openings 52a. The first communication holes 473 to 478 communicate with the associated internal spaces V through the first openings 52a.

Each of the first communication holes 473 to 478 has an opening end 461 opening on a side surface 470a of the second resin portion 470 on the outward side when viewed in the Z direction. The opening end 461 functions as an injection port for injecting an electrolytic solution into the internal space V The opening end 461 also functions as a connection port for the case member 480 when the case member 480 is attached to the second resin portion 470. The shapes of the opening ends 461 of the plurality of first communication holes coincide with each other, for example. A tapered portion 462 in which the length in the Z direction increases as it goes toward the opening end 461 is formed in each of the first communication holes 473 to 478. A width d3 of the opening end 461 in the lamination direction is wider than the width d2 (refer to FIG. 2) of the internal space V in the lamination direction.

The second resin portion 470 includes a plurality of first joining projection portions 472 provided on the side surface 470a. The plurality of first joining projection portions 472 are integrally formed with the second resin portion 470. The first joining projection portions 472 are provided in frame shapes along the opening ends 461 on the side surface 470a. The first joining projection portions 472 surround the opening ends 461. The first joining projection portions 472 join the power storage module 12 and the case member 480 to each other.

The case member 480 is formed of a resin such as PP, PPS, or modified PPE, for example. The case member 480 has a wall portion 486 corresponding to a bottom portion of a box. A plurality (here, six) of second communication holes 487 penetrating the wall portion 486 toward the cover member 490 side are provided in the wall portion 486. These second communication holes 487 respectively communicate with the associated first communication holes 473 to 478. The second communication holes 487 exhibit circular shapes in a cross section cut in a direction perpendicular to the X axis direction.

Each of frame-shaped second joining projection portions 488 is provided in the wall portion 486 of the case member 480. The second communication holes 487 are formed on the inward side in a region surrounded by the second joining projection portions 488. The second joining projection portions 488 are joined to the first joining projection portions 472, so that the power storage module 12 and the ease member 480 are joined to each other. The second joining projection portions 488 are joined to the first joining projection portions 472 through hot-plate welding, laser transmission welding, or ultrasonic welding, for example. The second joining, projection portions 488 have shapes and dimensions associated with the first joining projection portions 472. In this case, similar to the tapered portion 73c and the like in the foregoing embodiment, the tapered portion 462 plays a role of regulating a position for allowing the first communication holes 473 to 478 and the second communication holes 487 provided in the case member 480 to communicate with each other.

As illustrated in FIG. 14, the case member 480 has inner wall portions 484 forming a plurality (here, six) of tubular portions 484a accommodating the valve bodies 90. The inner wall portions 484 are integrated with the wall portion 486. The tubular portions 484a exhibit circular shapes in a cross section cut in a direction perpendicular to the X axis direction. The tubular portions 484a can communicate with the second communication holes 487. The valve bodies 90 are accommodated in the tubular portions 484a such that the second communication holes 487 are closed. The valve bodies 90 open and close the second communication holes 487. The clearance G is provided between the side surface of the valve body 90 and an inner wall surface of the inner wall portion 484.

The cover member 490 is a plate-shaped member for closing the openings of the case member 480. The cover member 490 is formed of a resin such as PP, PPS, or modified PPE, for example. The cover member 490 is joined to opening end surfaces of the case member 480 through heat welding. The cover member 490 also functions as a pressing member pressing the plurality of valve bodies 90 to the wall portion 486 of the case member 480. The accommodation spaces S communicating with the tubular portions 484a are provided between the inner wall portions 484 of the case member 480 and the cover member 490. In addition, a plurality (here, two) of exhaust ports 490a are provided in the cover member 490. The exhaust ports 490a communicate with the accommodation spaces S.

In the present modification example, the second communication holes 487 of the case member 480 communicate with the internal space V of the power storage module 12 through the first communication holes 473 to 478 of the second resin portion 470 and the openings 52a of the first resin portion 52. When the pressure in the internal space V is lower than the set pressure, a closed valve state in which the second communication holes 487 are closed by the valve bodies 90 is maintained. When the pressure in the internal space V rises and becomes equal to or higher than the set pressure, the valve bodies 90 are elastically deformed such that they are separated from the wall portion 486, thereby being in an open valve state in which the blocked second communication holes 487 are released. As a result, gas from the internal space V is discharged from the exhaust ports 490a through the clearances G between the outer surfaces of the valve bodies 90 and the inner wall surfaces of the inner wall portions 484, and the accommodation spaces S.

In the present modification example, the first communication holes 473 to 478 and the first joining projection portions 472 having a function, corresponding to the base member 70 are integrally formed in the second resin portion constituting the frame body 450. Therefore, a step of joining the frame body and the base member can be omitted, and therefore this can contribute to improvement in productivity. That is, in the present modification example, in the step of forming a frame body, for example, when the second resin portion 470 is formed through injection molding, the first communication holes 473 to 478 and the first joining projection portions 472 are formed as a structure of the second resin portion 470. Since these first communication holes 473 to 478 and the first joining projection portions 472 correspond to the base member 70, the step of connecting a base member in the foregoing embodiment is no longer necessary.

In each of the examples described above, unless there is any contradiction or problem, the constitutions thereof can be diverted or added to each other. For example, in the pressure regulating valve 401 illustrated in FIG. 14 as an example, the case member 80 may be employed in place of the case member 380, and the shapes of the first communication holes 473 to 478 and the first joining projection portions 472 may be changed to be suitable for the case member 80. In addition, the valve bodies 390 may be employed in place of the valve bodies 90, and the cover member 200 or the cover member 300 may be employed in place of the cover member 490.

REFERENCE SIGNS LIST

12 Power storage module
30 Laminate
30a Side surface
32 bipolar electrode
34 Electrode plate
34a Edge portion
36 Positive electrode
38 Negative electrode
50 Frame body
50a, 50a1, 50a2, 50a3, 50a4 Opening
50s Side surface
52 First resin portion
52a First opening
54 Second resin portion
54a Second opening
60 Pressure regulating valve
70 Base member (first member)
72 Side surface (first side surface)
72A, 721 First joining projection portion
72C First measurement projection portion
73 to 78 First communication holes
80 Case member (second member)
81 Side surface (second side surface)
81A, 81B Second joining projection portion
81C Second measurement projection portion
83 to 88 Second communication hole
83a to 88a Opening end (first opening end)
83b to 88b Opening end (second opening end)

89 Tubular portion
90 Valve body (elastic member)
100 Cover member (third member)
100a Exhaust port
A Axis
D1 Lamination direction
D2 Connection direction
S Accommodation space
V, V1 to V24 Internal space

The invention claimed is:
1. A power storage module comprising:
a laminate constituted of a plurality of laminated bipolar electrodes, each of the bipolar electrodes including an electrode plate, a positive electrode provided on one surface of the electrode plate, and a negative electrode provided on the other surface of the electrode plate, wherein a plurality of internal spaces is formed between the bipolar electrodes adjacent to each other in the laminate;
a frame body holding an edge portion of the electrode plate and provided with an opening communicating with at least one of the plurality of internal spaces; and
a pressure regulating valve attached to the frame body, wherein the pressure regulating valve has
a first member provided with a plurality of first communication holes respectively communicating with the plurality of internal spaces through the opening and attached to the frame body,
a second member provided with a plurality of second communication holes respectively communicating with the plurality of first communication holes and connected to a side surface of the first member on a side opposite to the opening side, wherein the plurality of second communication holes have first opening ends on the first member side and second opening ends on a side opposite to the first opening ends,
a plurality of elastic members closing the second opening ends, and
a third member pressing the plurality of elastic members against the second member,
wherein the first member is integrally formed with the frame body.
2. The power storage module according to claim 1, further comprising:
a plurality of the pressure regulating valves,
wherein the frame body is provided with a plurality of the openings to which the plurality of the pressure regulating valves is connected, and
wherein the plurality of the openings communicate with the internal spaces differing from each other for each of the openings.
3. The power storage module according to claim 1, wherein opening ends of the plurality of first communication holes on the opening side are disposed point-symmetrically with respect to an axis passing through a center on a side surface of the first member on the opening side and orthogonal to the side surface.
4. The power storage module according to claim 3, wherein opening ends of the plurality of first communication holes on the second member side and the first opening ends of the plurality of second communication holes are disposed point-symmetrically with respect to the axis.
5. The power storage module according to claim 1, wherein the elastic members are formed to have pillar shapes,
wherein the second member has a plurality of tubular portions respectively surrounding the second opening ends and accommodating the elastic members, and
wherein the elastic members are fixed to the tubular portions such that clearances are provided between inner surfaces of the tubular portions and the elastic members.
6. The power storage module according to claim 5, wherein end surfaces of the tubular portions on the third member side are separated from the third member.
7. The power storage module according to claim 6, wherein the second member and the third member are connected to each other such that an accommodation space accommodating the plurality of elastic members is formed, and
wherein an exhaust port allowing the accommodation space to communicate with an external space is provided in the third member at positions not overlapping the elastic members when viewed in a connection direction of the first member and the second member.
8. The power storage module according to claim 1, wherein the first member and the second member are connected to each other with a partitioning wall extending in a connection direction of the first member and the second member therebetween such that each of a plurality of communication paths formed by the plurality of first communication holes and the plurality of second communication holes is partitioned when viewed in the connection direction.
9. The power storage module according to claim 1, wherein the plurality of second opening ends are disposed in a manner of being shifted from each other in a direction intersecting a lamination direction of the laminate when viewed in a connection direction of the first member and the second member.
10. The power storage module according to claim 1, wherein support portions supporting the plurality of elastic members are provided on a surface of the third member on the second member side.
11. The power storage module according to claim 10, wherein the support portions have tubular shapes accommodating the elastic members.
12. The power storage module according to claim 10, wherein holes recessed on the second member side are formed on surfaces of the elastic members on the third member side, and
wherein the support portions have projecting shapes fitted into the holes of the elastic members.
13. A power storage module comprising:
a laminate constituted of a plurality of laminated bipolar electrodes, each of the bipolar electrodes including an electrode plate, a positive electrode provided on one surface of the electrode plate, and a negative electrode provided on the other surface of the electrode plate, wherein a plurality of internal spaces is formed between the bipolar electrodes adjacent to each other in the laminate;
a frame body holding an edge portion of the electrode plate and provided with an opening communicating with at least one of the plurality of internal spaces; and
a pressure regulating valve attached to the frame body, wherein the pressure regulating valve has
a first member provided with a plurality of first communication holes respectively communicating with the plurality of internal spaces through the opening and attached to the frame body, a second member provided with a plurality of second communication holes respectively communicating with the plurality of first communication holes and connected to a side surface of the first member on a side opposite to the opening side, wherein the plurality of second communication holes have first opening ends on the first member side and second opening ends on a side opposite to the first opening ends, a plurality of elastic members closing the second opening ends, a third member pressing the plurality of elastic members against the second member, and a plurality of the pressure regulating valves, wherein the frame body is provided with a plurality of the openings to which the plurality of the pressure regulating valves is connected, and wherein the plurality of the openings communicate with the internal spaces differing from each other for each of the openings.

14. The power storage module according to claim 13, wherein the elastic members are formed to have pillar shapes, wherein the second member has a plurality of tubular portions respectively surrounding the second opening ends and accommodating the elastic members, and wherein the elastic members are fixed to the tubular portions such that clearances are provided between inner surfaces of the tubular portions and the elastic members.

15. The power storage module according to claim 14, wherein end surfaces of the tubular portions on the third member side are separated from the third member.

16. The power storage module according to claim 15, wherein the second member and the third member are connected to each other such that an accommodation space accommodating the plurality of elastic members is formed, and wherein an exhaust port allowing the accommodation space to communicate with an external space is provided in the third member at positions not overlapping the elastic members when viewed in a connection direction of the first member and the second member.

17. A power storage module comprising:

a laminate constituted of a plurality of laminated bipolar electrodes, each of the bipolar electrodes including an electrode plate, a positive electrode provided on one surface of the electrode plate, and a negative electrode provided on the other surface of the electrode plate, wherein a plurality of internal spaces is formed between the bipolar electrodes adjacent to each other in the laminate;

a frame body holding an edge portion of the electrode plate and provided with an opening communicating with at least one of the plurality of internal spaces; and a pressure regulating valve attached to the frame body, wherein the pressure regulating valve has a first member provided with a plurality of first communication holes respectively communicating with the plurality of internal spaces through the opening and attached to the frame body, a second member provided with a plurality of second communication holes respectively communicating with the plurality of first communication holes and connected to a side surface of the first member on a side opposite to the opening side, wherein the plurality of second communication holes have first opening ends on the first member side and second opening ends on a side opposite to the first opening ends, a plurality of elastic members closing the second opening ends, and a third member pressing the plurality of elastic members against the second member, wherein the plurality of second opening ends are disposed in a manner of being shifted from each other in a direction intersecting a lamination direction of the laminate when viewed in a connection direction of the first member and the second member.

18. The power storage module according to claim 17, wherein the elastic members are formed to have pillar shapes, wherein the second member has a plurality of tubular portions respectively surrounding the second opening ends and accommodating the elastic members, and wherein the elastic members are fixed to the tubular portions such that clearances are provided between inner surfaces of the tubular portions and the elastic members.

19. The power storage module according to claim 18, wherein end surfaces of the tubular portions on the third member side are separated from the third member.

20. The power storage module according to claim 19, wherein the second member and the third member are connected to each other such that an accommodation space accommodating the plurality of elastic members is formed, and wherein an exhaust port allowing the accommodation space to communicate with an external space is provided in the third member at positions not overlapping the elastic members when viewed in a connection direction of the first member and the second member.

\* \* \* \* \*